United States Patent [19]

Yamashita et al.

[11] Patent Number: 5,624,793
[45] Date of Patent: Apr. 29, 1997

[54] METHOD OF MANUFACTURING SOLID PROCESSING COMPOSITION FOR SILVER HALIDE PHOTOGRAPHIC LIGHT-SENSITIVE MATERIALS

[75] Inventors: Hiroshi Yamashita; Hiroshi Yoshimoto; Koji Takemura, all of Hino, Japan

[73] Assignee: Konica Corporation, Japan

[21] Appl. No.: 551,719

[22] Filed: Nov. 1, 1995

[30] Foreign Application Priority Data

Nov. 11, 1994 [JP] Japan .................................. 6-277979
Nov. 11, 1994 [JP] Japan .................................. 6-277980
Nov. 11, 1994 [JP] Japan .................................. 6-277981

[51] Int. Cl.$^6$ ................................................ G03C 5/30
[52] U.S. Cl. ................................ 430/458; 430/465
[58] Field of Search ................................ 430/398, 458, 430/465

[56] References Cited

U.S. PATENT DOCUMENTS

| | | |
|---|---|---|
| 4,923,786 | 5/1990 | Kuhnert et al. . |
| 5,053,321 | 10/1991 | Kuhnert . |
| 5,055,384 | 10/1991 | Kuhnert . |
| 5,135,840 | 8/1992 | Reuter et al. . |
| 5,457,010 | 10/1995 | Satake et al. . |

Primary Examiner—Hoa Van Le
Attorney, Agent, or Firm—Jordan B. Bierman; Bierman and Muserlian

[57] ABSTRACT

A method of manufacturing a solid granular processing composition for a silver halide photographic light sensitive material is disclosed, the method comprising the steps of (1) fluidizing in air current powder particles comprising a compound selected from the group consisting of a thiosulfate, a sulfite, a bisulfite, an aminopolycarboxylic acid ferric complex, a carbonate, a p-phenylenediamine type developing agent and a hydroxylamine or its derivative; and (2) granulating the fluidized particles at a theoretical relative humidity of 15 to 60%, while spraying a binder water to the particles to obtain granules.

12 Claims, 1 Drawing Sheet

METHOD OF MANUFACTURING SOLID PROCESSING COMPOSITION FOR SILVER HALIDE PHOTOGRAPHIC LIGHT-SENSITIVE MATERIALS

FIELD OF THE INVENTION

The invention relates to a manufacturing method of a granular or tablet processing composition for a silver halide photographic light-sensitive material.

BACKGROUND OF THE INVENTION

A silver halide photographic light sensitive material is photographically processed through a development step, a bleaching step, a washing step and a stabilization step after being exposed. The photographic processing is ordinarily conducted using an automatic processing machine. On such occasions, a replenisher replenishing system is commonly used wherein activity of the processing solution in a processing tank is kept constant. In the replenisher replenishing system, dilution of components dissolved out from the light-sensitive material, correction of the amount of evaporation and replenishment of consumed components are carried out, resulting in a large amount of waste solution.

Recently, world wide movements for regulations on prohibiting dumping photo-effluent into oceans and regulations against disposal of plastic materials have been promoted. Accordingly, development of a new system in which the photographic waste solution is reduced and bottles for processing agents are eliminated is demanded.

In addition, safety regulations on packaging materials have been made strengthened to maintain safety regarding the transportation of liquid hazardous substances, resulting in an increase of cost. In recently rapidly increasing mini-labs has been introduced a processing system in which prints are easily obtained on account of progress of exposure controlling technique of prints. There are many mini-labs where a part timer or side worker works but controlling of processing solutions or dissolution of replenishing solutions is difficult, and a serious error, for example, dissolution or replenishment of a wrong processing solution is likely to occur. Therefore, this conventional replenishment system has drawn much frequent complaints.

Accordinly, in the photographic industry a solid processing composition has been strongly demanded in which bottles for processing agents are eliminated and dissolving operations are also eliminated. In response to these demands Japanese Patent O.P.I. Publication No. 5-119454/1993 discloses a method of solidifying almost all processing components and directly supplying these solids in processing tanks.

However, manufacturing of a solid processing composition has a problem in producibility, production cost or stable productivity.

The forcible granulating using a stirring granulator of production scale (80 kg or more per batch) is likely to produce bulky granules having a diameter of 5 mm or more. The bulky granules are difficult to fluidize and combine with surrounding particles to form more bulky granules. It has been found that such a bulky granules have the following problems. The granules have a dry surface but have a moisture in an inner portion, and therefore, requires a long time for drying. The granules dried for such a long time are heavy granules of high density, resulting in lowering of solubility. Further, tablets obtained by compression molding the granules have insufficient hardness and poor anti-abrasion property.

In response to the above, the bulky granules can be classified or crushed during drying, however, this adds extra processes and requires longer production time, resulting in low yield. Further, the crushing is likely to produce fine powder not suitable for tableting, and to cause a problem regarding properties of a solid processing composition such as fluctuation of particle distribution, or capping or fluctuation of loading amount during tableting.

A method of manufacturing a solid granular processing composition is disclosed in Japanese Patent O.P.I. Publication Nos. 3-39739/1991, 3-39735/1991 and 2-09042/1990, which uses a fluid bed granulator. This method is advantageous as far as the obtained granules are final products.

However, when granulating a composition comprising a thiosulfate, a sulfite, a bisulfite, an aminopolycarboxylic acid ferric complex, a carbonate, a p-phenylenediamine type developing agent, a hydroxylamine or a derivative thereof, using a fluid bed granulator, it has been proved that fluidizing is difficult to control, powder is likely to adhere to the inner walls or dust collector filter of the granulator, or the obtained granules cause blocking, capping or fluctuation of loading amount causes at tableting and tablets obtained by compression molding the granules cause fluctuation of a loading amount or abrasion or expansion, during long term storage or under high temperature and humidity, and therefore, the granules are not suitable for tableting.

SUMMARY OF THE INVENTION

In view of the above, the present invention has been made. An object of the invention is to provide a manufacturing method of a solid processing composition for a silver halide photographic light sensitive material, the method comprising the steps of:

granulating a composition comprising a thiosulfate, a sulfite, a bisulfite, an aminopolycarboxylic acid ferric complex, a carbonate, a p-phenylenediamine type developing agent or a hydroxylamine or its derivative, using a fluid bed. granulator, to obtain granules; and then compression-molding the granules into tablets, wherein the method can give good yield, prevent fine powder or large particle powder occurrence, blocking during storage in granular form and adherence of the powder to the inner walls or dust collector filter of the granulator, and prevent fluctuation of loading amount or capping while compression-molding the resulting granules and abrasion or expansion of the resulting tablets.

DETAILED DESCRIPTION OF THE INVENTION

Figure 1:
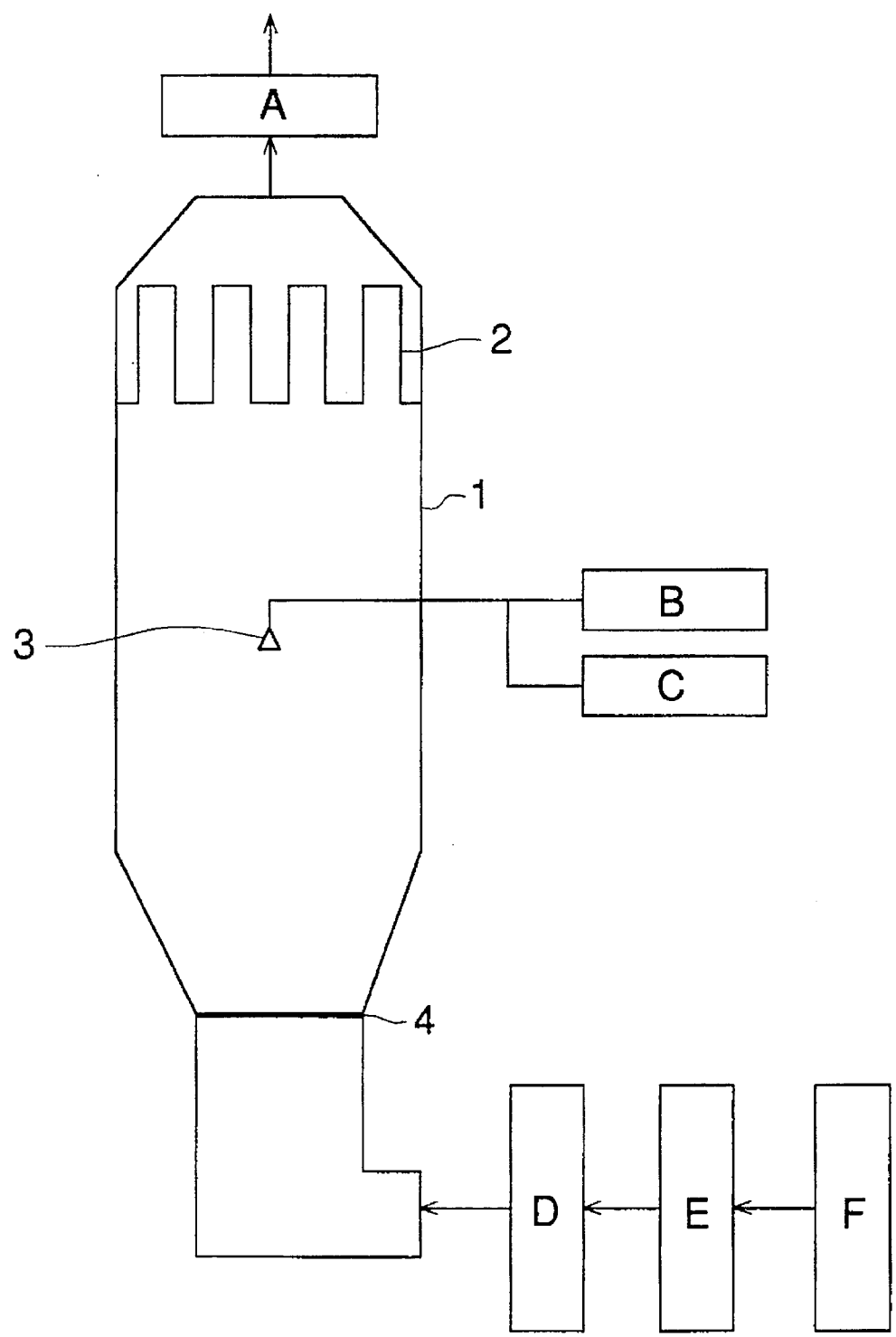
FIG. 1 shows an outline of fluid bed granulator.

The above object of the invention can be attained by the following methods:

a method of manufacturing a solid granular processing composition for a silver halide photographic light sensitive material, the method comprising the steps of:

fluidizing in air current powder particles comprising at least one compound selected from a thiosulfate, a sulfite, a bisulfite, an aminopolycarboxylic acid ferric complex, a carbonate, a p-phenylenediamine type developing agent and a hydroxylamine or its derivative; and spraying a binder water to the fluidized particles to granulate the particles and to obtain granules, wherein said granulating is carried out at a theoretical relative humidity of 15 to 60%, and preferably 20 to 50%, said spraying is carried out using a two fluid nozzle, the gas/liquid ratio in the two fluid nozzle is 100 to 10,000, and preferably 1,000 to 5,000 in which the ratio is defined to be (volume of air for spraying per unit time )/(a binder water volume supplied per unit time), dehumidified air is supplied for fluidizing the particles, the particles have a weight average diameter of 20 to 350 μm, the total amount of the binder water is 1 to 50 weight % based on the total amount of the particles or the binder concentration of the binder water is 1 to 60 weight %, or a method of manufacturing a tablet processing composition for a silver halide photographic light sensitive material comprising the steps of:
compression-molding the granules obtained by the above at a dwell time of 0.02 to 1.0 second.

The above object of the invention can be also attained by the following methods:

a method of manufacturing a solid granular processing composition for a silver halide photographic light sensitive material, the method comprising the steps of:

fluidizing, in air current of air flow rate of 0.1 to 5.0 m/sec., powder particles, the particles comprising at least one compound selected from a thiosulfate, a sulfite, a bisulfite, an aminopolycarboxylic acid ferric complex, a carbonate, a p-phenylenediamine type developing agent and a hydroxylamine or its derivative; and granulating the fluidized particles while spraying a binder water to the particles to obtain granules, wherein the spraying is carried out using a two fluid nozzle, a gas/liquid ratio in the two fluid nozzle is 100 to 10,000, in which the ratio is defined to be (volume of air for spraying sprayed per unit time )/(a binder water volume supplied per unit time), the content of the compound is 5 weight % or more, the powder particles have a weight average particle diameter of 20 to 350 μm, a device for the granulating is equipped with a flow rate adjusting plate having an aperture rate of 1.0 to 20%, the supplying air amount to spraying rate of the binder water is 1 to 20 m³/g, the total amount to be sprayed of the binder water is 1 to 50% by weight based on the total weight of the powder particles, or the binder concentration of the binder water is 1.0 to 60 weight % or a method of manufacturing a tablet processing composition for a silver halide photographic light sensitive material comprising the steps of:
compression-molding the granules obtained by the above described method at a dwell time of 0.02 to 1.0 second.

The above object of the invention can be also attained by the following methods:

a method of manufacturing a solid granular processing composition for a silver halide photographic light sensitive material, the method comprising the steps of:

fluidizing in air current powder particles, the particles having a weight average particle diameter of 20 to 350 μm and comprising at least one compound selected from a thiosulfate, a sulfite, a bisulfite, an aminopolycarboxylic acid ferric complex, a carbonate, a p-phenylenediamine type developing agent, and a hydroxylamine or its derivative; and granulating the fluidized particles while spraying a binder water to the particles to obtain granules, wherein the granulating is carried out at a temperature of 20° to 80° C., the fluidizing is carried out at using air having a moisture amount of not more than 0.015 kgH₂O/kg, the binder concentration of the binder water is 1.0 to 60 weight %, said spraying is carried out using a two fluid nozzle, the gas/liquid ratio in the two fluid nozzle is 100 to 10,000 in which the ratio is defined to be (mist gas volume sprayed per unit time )/(a binder water volume supplied per unit time) or dehumidified air is supplied for fluidizing the particles, or a method of manufacturing a tablet processing composition for a silver halide photographic light sensitive material comprising the steps of:
compression-molding the granules obtained by the above at a dwell time of 0.02 to 1.0 second.

The present inventors have considered that when granulating in a fluid bed a composition comprising a thiosulfate, a sulfite, a bisulfite, an aminopolycarboxylic acid ferric complex, a carbonate, a p-phenylenediamine type developing agent or a hydroxylamine or its derivative while supplying a binder water, the resulting granules cause blocking and tablets obtained by compression molding the granules can not prevent abrasion or expansion due to water solubility of these compounds. In view of the above, the inventors have made an intensive study on various elements and found that the above problems can be overcome by granulating under a specific relative humidity condition, by granulating powder particles having a weight average particle diameter of 20 to 350 μm under a specific temperature condition, or by granulating powder particles under specific range of air flow rate.

The invention will be detailed below.

The manufacturing method of a solid granular processing composition of the invention is a method employing a fluid bed granulating. That is, the powder particles maintained in fluidizing state by air current are sprayed with a solution containing a binder to the particles, and the particles aggregate by a binding force between them to obtain granules. The method is characterized in that materials for the processing composition can be mixed, granulated and dried in the same vessel. The resulting granules is very porous, excellent in solubility, and suitable for tableting.

The powder particles referred to in the invention are powder, crystals, granules or a mixture thereof. The granules referred to is one obtained by granulating powder or fine crystals and has a particle diameter of 53 to 2830 μm.

The solid granular processing composition of the invention has a weight average particle diameter of preferably 100 to 600 μm in view of its usage. The weight average particle diameter D herein is given by D=(Σn·d/Σn), wherein d represents a center value of a mesh of each of plural JIS standard sieves, and n represents weight frequency of granules.

The powder particles before granulating have a weight average particle diameter of 20 to 350 μm, and preferably 50 to 150 μm. When the diameter is less than 20 μm, materials for a photographic processing composition tend to absorb moisture and cause blocking, resulting in non-uniform fluidizing or clogging of a filter used. When the diameter exceeds 350 μm, the effects of the invention deteriorate. The large particles in the materials are preferably pulverized or dressed in which a pulverizer or dresser such as a hammer mill, a pin mill, a roll mill or a screen mill is used.

FIG. 1 shows an outline of one example of a fluid bed granulator. The manufacturing method of the invention will be explained based on the Figure.

The gas supplied by a gas supplying fan F is filtered by filter E made of chemical fibers, heated to a specific temperature by heat exchanger D, and then introduced to fluid bed granulator 1 through flow adjusting plate 4. The heated gas maintains powder particles in suspension state, and serves as a heater to dry a humidified fluid bed as well as uniformly contacts the particles with liquid drops sprayed by compressed air B, liquid transport member C and spraying member 3. The fine powder scattered above is collected in dust collector filter 2, and the collected are dropped in the fluid bed. The filtered gas is exhausted by exhaust fan A.

The gas to be supplied may be nitrogen or an inert gas, but is preferably air in view of cost. It is preferable that a dehumidifying member is further provided so as not to be influenced by seasons or weather.

When the powder particles are fluidized by gas which is dehumidified by the dehumidifying member to an absolute moisture amount of not more than 0.015 $kgH_2O/kg$, vaporization of water in the particles and granules produced is easily controlled and the invention is effected. The amount of gas supplied is preferably 1–20 $m^3/g$, and more preferably 5–15 $m^3/g$, based on the spraying rate of the binder water.

The gas flow rate in the invention refers to a value obtained by dividing gas amount supplied per unit time by the area of a flow adjusting plate, that is, gas flow rate passing through the flow adjusting plate. The gas flow rate in the invention is 0.1 to 5.0 m/sec., and preferably 1.0 to 3.0 m/sec. When the rate is not more than 0.1 m/sec., gas is difficult to flow during spraying, resulting in large particles occurrence or stoppage of the flow. On the contrary, when the rate exceeds 5.0 m/sec., the resulting granules degrade or fine powder accumulates on the walls of a granulator or a dust collector filter, resulting in poor yield of granules. Further, the resulting fine powder has a tendency to have an adverse effect on tableting.

The aperture rate of the flow adjusting plate is preferably 1 to 20%, and more preferably 5 to 15% in view of fluidity.

The dust collector filter is preferably divided into two in that the fluidizing need not be stopped during granulating.

The fluid bed granulator is available on the market. The examples include Multiflex series, GPCG series, WST/WSG series produced by Powrex Co., Ltd., New marumelizer series produced by Fuji Paudal Co., Ltd., Mixgrad series produced by Ohkawara Co., Ltd. and Spiralflow series and[Flow coater series produced by Freund Co., Ltd.

The theoretical relative humidity in the invention is computed from temperature t at the inlet of air to be supplied to a fluid bed granulator, relative humidity H, air amount S supplied after heated, temperature L during granulating in the granulator, spraying speed v of a binder water and solid concentration C of the binder water according to the following equation:

Theoretical relative humidity (%)=[saturated moisture amount at temperature t (g/g)×relative humidity H (%)/100+spraying speed v (g/min.)×{100−solid concentration C (%)}/100/air amount supplied S (g/min.)]/saturated moisture amount at temperature L in the fluid bed granulator (g/g)×100.

The air supplied to the granulator is preferably dehumidified in order to fluidize powder particles, which has an advantage in that granules having stable properties can be produced and drying time is shortened. The dehumidifying method is preferably a method of cooling air by water or a refrigerant to condense the moisture. The cooling temperature of air is preferably not more than 20° C. When air is dehumidified by this method, the theoretical relative humidity in the invention is computed according to the following equation:

Theoretical relative humidity (%)=[saturated moisture amount at the cooling temperature (g/g)+spraying speed v (g/min.)×{100−solid concentration C (%)}/100/air amount supplied S (g/min.)]/saturated moisture amount at temperature L in the fluid bed granulator (g/g)×100.

A means for spraying a binder water to fluidizing powder particles includes a pressure nozzle, a rotation disk and a two fluid nozzle. The pressure nozzle gives fine liquid drops by spraying the binder water in air by pressure whereby a spraying speed relative to the air is obtained. The rotation disk gives fine liquid drops at the periphery by centrifugal force dropping the binder water on the disk rotating at a high speed. The two fluid nozzle gives fine liquid drops by dispersing the binder water with a high speed current since compressed air, nitrogen gas or steam gives the current with a relatively low pressure.

In the invention the method of spraying the binder water with the two fluid nozzle is preferable in that the liquid drops are rapidly dried and granules suitable for compression-molding are obtained with ease. The gas/liquid ratio in the invention is defined to be a ratio of a volume of gas for spraying per unit time sprayed from a nozzle to a volume of a binder water supplied per unit time, that is, (a gas volume per unit time sprayed)/(a binder water volume supplied per unit time). The gas/liquid ratio in the invention is preferably 100 to 10,000, and more preferably 1,000 to 5,000.

The binder water referred to in the invention may be a solvent only, but preferably a solution containing a binder. The solvent includes water and a mixture of water and alcohol, but preferably water in view of an influence on a light sensitive material, safety, or production cost. The alcohol includes methyl alcohol, ethyl alcohol, propyl alcohol, isopropyl alcohol and butyl alcohol. The binder combines particles. In view of solubility or an influence on a light sensitive material, the binder is preferably saccharides or water soluble polymer, for example, sugar alcohols, monosaccharides, disaccharides, dextrins, celluloses, polyalkylene glycols or polyvinyl pyrrolidone, and more preferably sugar alcohols, dextrins or polyalkylene glycols. The binder water may contain an oxidizing agent, a reducing agent, an alkali agent or a buffering agent in such amount that the effect of the invention is restrained. The compounds used in the binder water are available on the market.

The concentration of the binder in the binder water is preferably 1 to 60 weight %, and more preferably 5 to 30 weight %, in view of mist, uniformity of granules obtained or clogging of nozzles. The spraying amount of the binder water is preferably 1 to 50 weight %, and more preferably 5 to 25 weight % based on the particles for granulating, in view of obtaining the desired granules.

Next, the compounds contained in the solid processing composition of the invention will be explained below. The granulation of particles containing at least one selected from the group consisting of the compounds in an amount of 5 weight or more are effected in the invention.

The thiosulfate preferably includes ammonium thiosulfate, sodium thiosulfate or potassium thiosulfate.

The sulfite preferably includes ammonium sulfite, sodium sulfite or potassium sulfite.

The bisulfite preferably includes ammonium bisulfite, sodium bisulfite or potassium bisulfite, ammonium metabisulfite, sodium metabisulfite or potassium metabisulfite.

The carbonate preferably includes potassium carbonate or sodium carbonate.

The preferable amino polycarboxylic acid is a ferric salt of a chelating compound represented by Formula (A-I) through (A-VII).

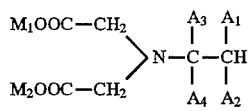  Formula (A-I)

wherein $A_1$ to $A_4$ represent each a hydrogen atom, a hydroxy group, —COOM', —PO$_3$(M$_1$)$_2$, —CH$_2$COOM$_2$, —CH$_2$OH or a lower alkyl group which may have a substituent, provided that at least one of $A_1$ to $A_4$ represents —COOM', —PO$_3$(M$_1$)$_2$ or —CH$_2$COOM$_2$; and M', M$_1$ and M$_2$ represent each a hydrogen atom, an ammonium group, an alkali metal atom or an organic ammonium group,

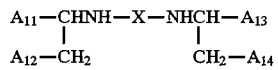  Formula (A-II)

wherein $A_{11}$ to $A_{14}$ represent each —CH$_2$OH, —COOM$^3$ or —PO$_3$(M$^4$)$_2$; M$^3$ and M$^4$ represent each a hydrogen atom, an ammonium group, an alkali metal atom or an organic ammonium group; X represents an alkylene group having 2 to 6 carbon atoms or —(B$_1$O)$_n$—B$_2$—in which n is an integer of 1 to 8 and B$_1$ and B$_2$ represent each an alkylene group having 1 to 5 carbon atoms,

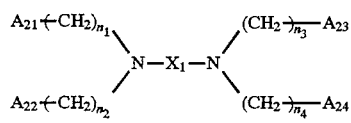  Formula (A-III)

wherein $A_{21}$ to $A_{24}$ represent each —CH$_2$OH, —COOM$_5$ or —PO$_3$(M$_6$(2; M$_5$ and M$_6$ represent each a hydrogen atom, an ammonium group, an alkali metal atom or an organic ammonium group; X$_1$ represents a straight-chained or branched alkylene group having 2 to 6 carbon atoms, a saturated or unsaturated organic ring or (B$_{11}$O)$_{n5}$ —B$_{12}$ in which n$_5$ represents an integer of 1 to 8, and B$_{11}$ and B$_{12}$ represent each an alkylene group having 1 to 5 carbon atoms; and n$_1$ through n$_4$ represent each an integer of 1 or more,

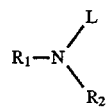  Formula (A-IV)

wherein $R_1$ and $R_2$ represent each a hydrogen atom, an alkyl group or an aryl group; L represents,

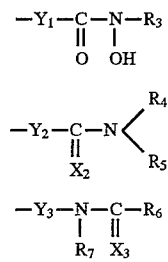

wherein $Y_1$ through $Y_3$ represent each an alkylene or arylene group; $X_2$ and $X_3$ represent each an oxygen atom or a sulfur atom; and $R_3$ to $R_7$ represent each a hydrogen atom, an alkyl group or an aryl group,

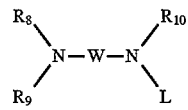  Formula (A-V)

wherein $R_8$ through $R_{10}$ represent each a hydrogen atom or an alkyl or aryl group, which may have a substituent; L is the same as those denoted in L of Formula (A-IV); and W represents a divalent linking group,

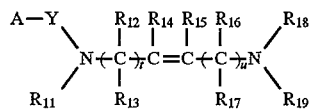  Formula (A-VI)

wherein $R_{11}$ through $R_{13}$ and $R_{16}$ through $R_{19}$ represent each a hydrogen atom or an alkyl or aryl group, which may have a substituent; $R_{14}$ and $R_{15}$ represent each a hydrogen atom, a halogen atom, a cyano group, a nitro group, an acyl group, a sulfamoyl group, a carbamoyl group, an alkoxycarbonyl group, an aryloxycarbonyl group, a sulfonyl group, a sulfinyl group or an alkyl or aryl group, which may have a substituent, provided that $R_{14}$ and $R_{15}$ may combine to form a 5-membered or 6-membered ring; A represents a carboxy group, a phosphono group, a sulfo group, a hydroxy group or an alkyl metal salt or ammonium salt thereof; Y represents an alkylene or arylene group, which may have a substituent; and t and u are each an integer of 0 or 1,

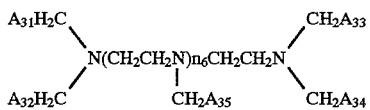  Formula (A-VII)

wherein $A_{31}$ to $A_{35}$ represent each —COOM$_7$ or —PO$_3$M$_8$M$_9$; M$_7$, M$_8$ and M$_9$ represent each a hydrogen atom, an alkali metal atom or an ammonium group; and n$_6$ represents an integer of 0 or 1.

The concrete preferable amino polycarboxylic acid includes exemplified compounds A-I-1 through A-I-15, A-II-1 through A-II-17, A-III-1 through A-III-41, A-IV-1 through A-IV-30, A-V-1 through A-V-35 and A-VI-1 through A-VI-16 disclosed in Japanese Patent O.P.I. Publication No. 65151/1994, diethylenetriamine pentaacetic acid, triethylenetetramine hexaacetic acid and diethylenetriamine pentamethylene-phosphonic acid. The especially preferable are the following compounds.

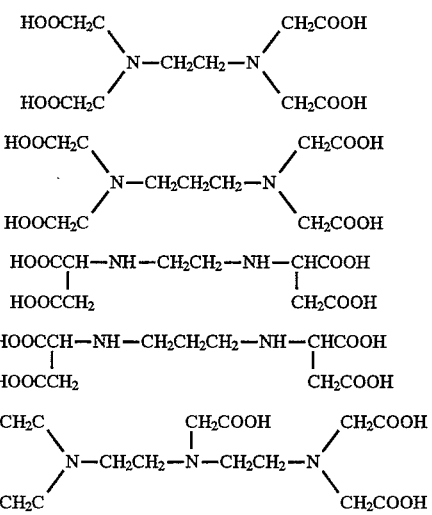

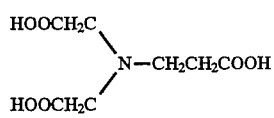

As a p-phenylene diamine type compound is preferable a p-phenylene diamine type compound having a water-solubilizing group. The p-phenylene diamine type compound having a water-solubilizing group has at least one water solubilizing group on its amino group or its benzene nucleus. The typical water-solubilizing groups include preferably —$(CH_2)_n$—$CH_2OH$—, —$(CH_2)_m$—$NHSO_2$—$(CH_2)_n$—$CH_3$, —$(CH_2)_m$—O—$(CH_2)_n$—$CH_3$, —$(CH_2CH_2O)_nC_mH_{2m+1}$ (in which m and n are each an integer of not less than 0).

The typical examples of the p-phenylene diamine type compound preferably used in the invention include compounds (C-1) through (C-16) disclosed on pages 7 to 9 of Japanese Patent O.P.I. Publication No. 4-86741/1992 and compounds (1) through (26) disclosed on pages 6 to 10 of Japanese Patent O.P.I. Publication No. 3-246543/1991. The above developing agent is usually used in the form of hydrochloric acid, sulfuric acid or p-toluenesulfonic acid salt. The preferable compounds will be given below.

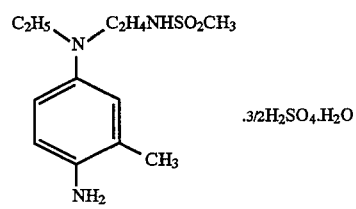

(C-1)

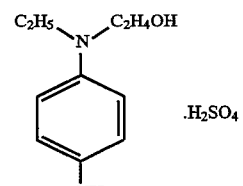

(C-2)

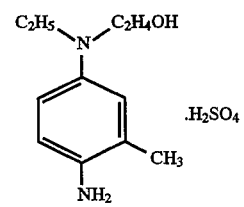

(C-3)

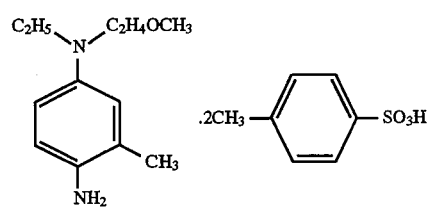

(C-4)

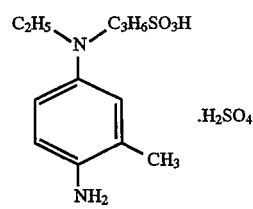

(C-5)

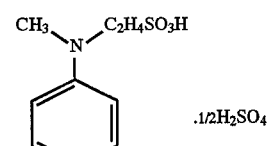

(C-6)

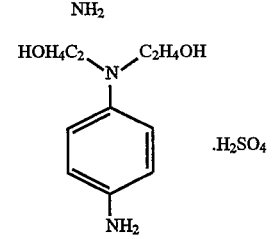

(C-7)

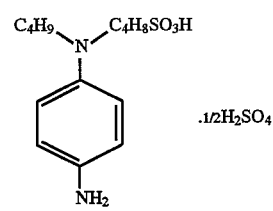

(C-8)

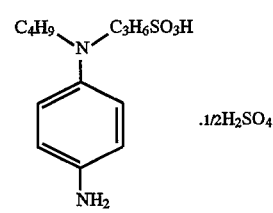

(C-9)

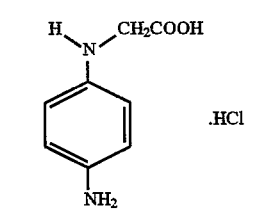

(C-10)

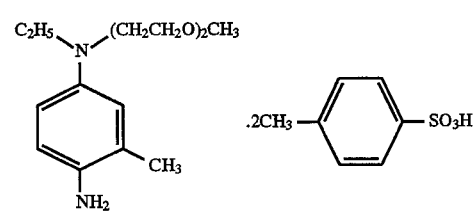

(C-11)

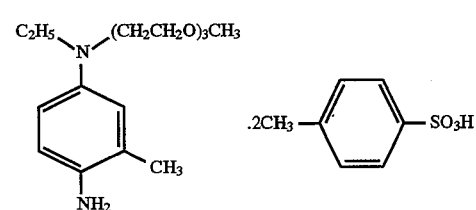

(C-12)

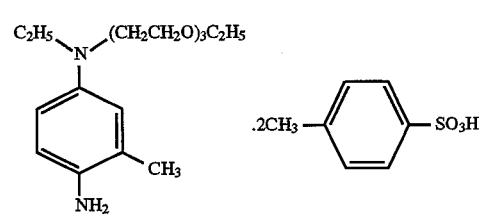

(C-13)

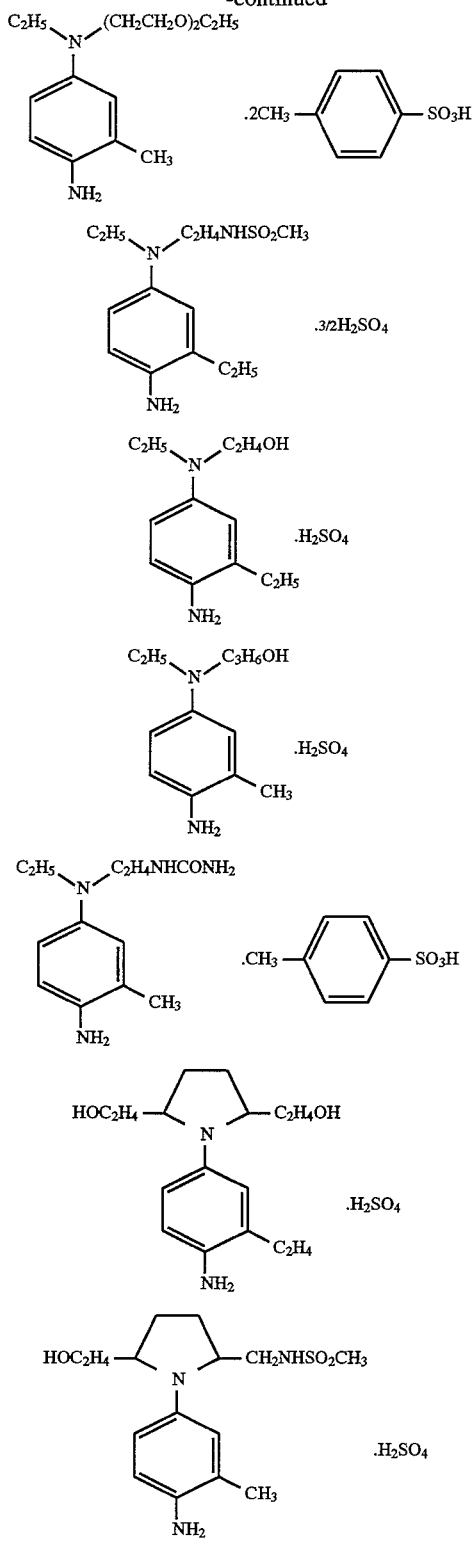

Of these compounds (C-1), (C-3) and (C-17) through (C-20) are more preferably used, and (C-1) and (C-3) especially preferablyused.

The preferable hydroxylamine derivatives in the invention is a compound represented by the following Formula (B):

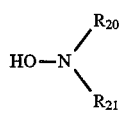

Formula (B)

wherein $R_{20}$ and $R_{21}$ independently represent a hydrogen atom or an alkyl group which may have a substituent.

The alkyl group represented by $R_{20}$ and $R_{21}$ represents a straight-chained or branched alkyl group having 1 to 10 carbon atoms which may have a substituent and, among them, those having 1 to 5 carbon atoms are preferred. The substituent include a carboxy group, a sulfo group, a phosphono group, a phosphinic acid residual group, a hydroxy group, a cyano group, an alkoxy group, an amino group which may have an alkyl group, an ammonio group which may have an alkyl group, a carbamoyl group which may have an alkyl group, a sulfamoyl group which may have an alkyl group, an alkylsulfonyl group which may have a substituent, an acylamino group, an alkylsulfonylamino group, an arylsulfonylamino group, an alkoxycarbonyl group, an arylsulfonyl group, a nitro group, a cyano group or a halogen atom. Two or more substituets may be present. The preferable $R_{20}$ and $R_{21}$ include a hydrogen atom, a methyl group, an ethyl group, a propyl group, a carboxymethyl group, a carboxyethyl group, a carboxypropyl group, a sulfoethyl group, a sulfopropyl group, a sulfobutyl group, a phosphonomethyl group, a phosphonoethyl group, a methoxyethyl group, a cyanoethyl group and a hydroxyethyl group and, among them, the particularly preferable include-a hydrogen atom, a carboxymethyl group, a carboxyethyl group, a sulfoethyl group, a sulfopropyl group, a phosphonomethyl group, a methoxyethyl group, a cyanoethyl group and a phosphonoethyl group. $R_{20}$ and $R_{21}$ may also combine with each other so as to form a ring together with a nitrogen atom.

The compounds represented by Formula (B) can be usually used in free amine or in the form of hydrochloric acid, sulfate, p-toluenesulfonic acid, oxalic acid, phosphoric acid or acetic acid salt. When the compounds have an anionic substituent such as a carboxy group, a sulfo group or a phosphono group, they may form a salt with an alkali atom or an ammonium.

The representative of compounds represented by Formula (B) will be given below, but is not limited thereto.

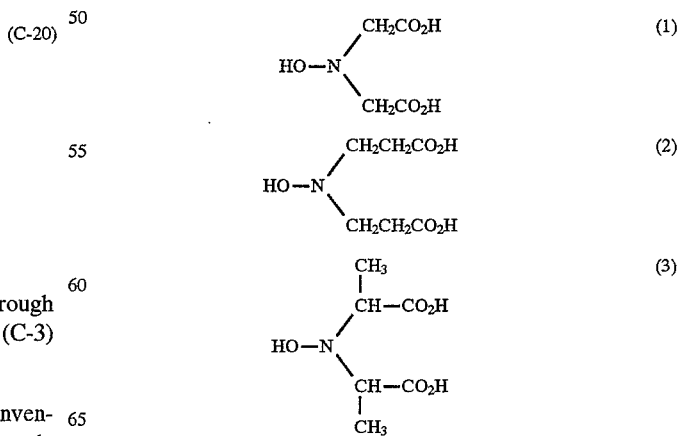

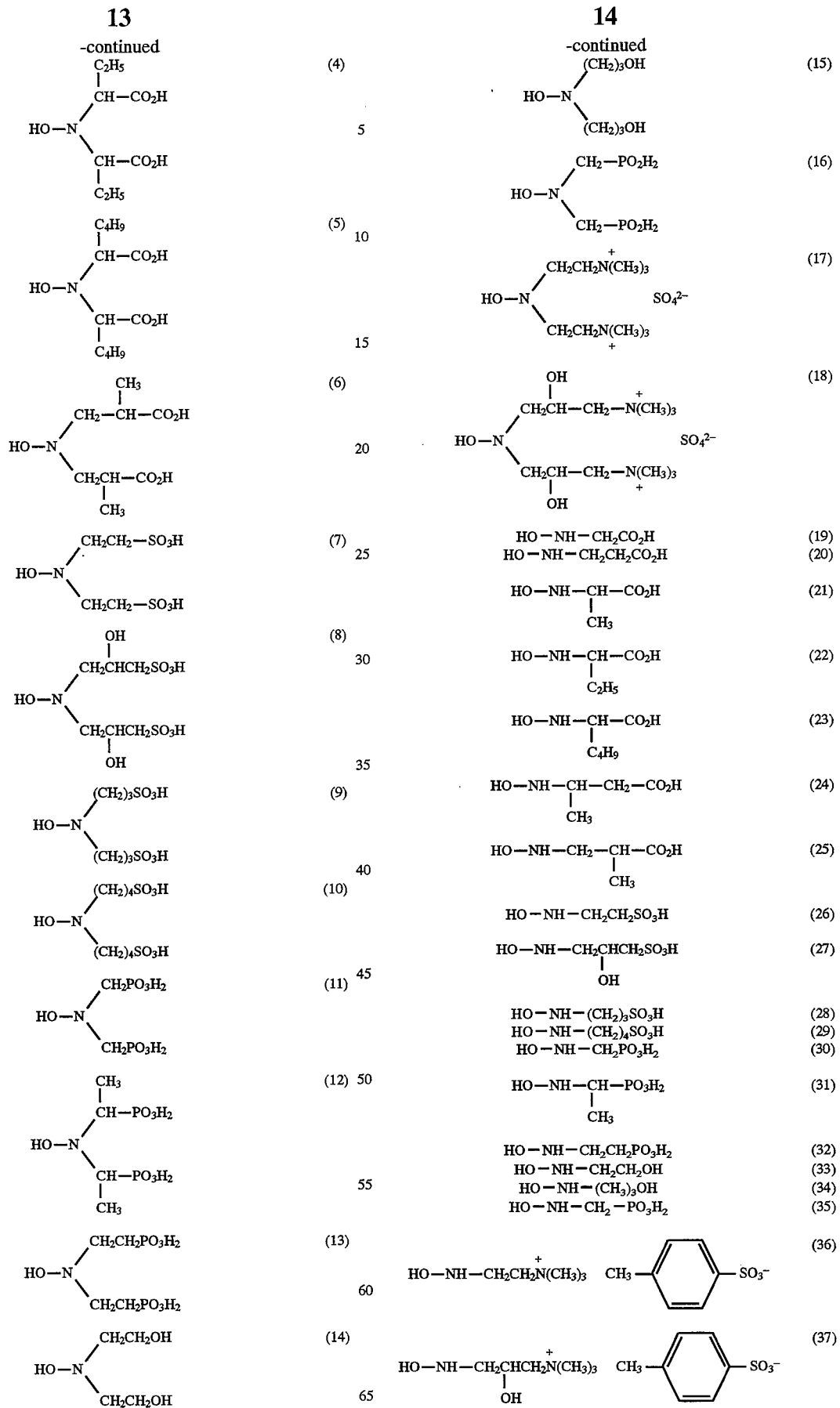

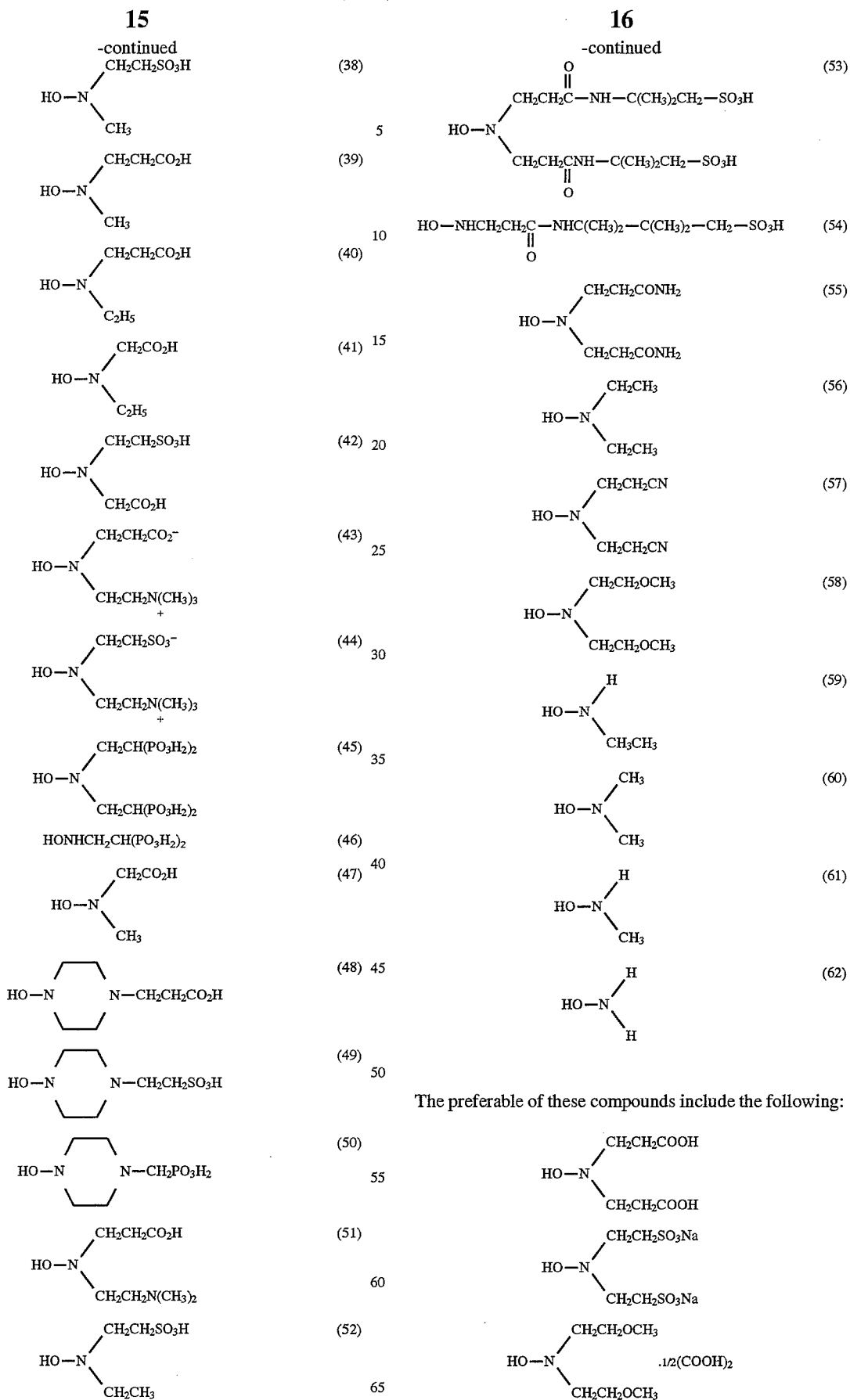

-continued

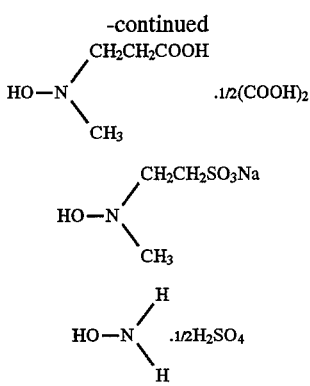

The manufacturing method of the tablets of the invention will be detailed below.

The tablet solid processing composition in the invention (hereinafter referred to simply tablets) is obtained by compression-molding into a specific shape a solid processing composition comprising granules, and preferably by compression-molding into tablets a composision consisting of granules in that the invention is markedly effected. One kind of granules is preferably compression-molded, and two or more kinds of granules may be used in view of storage stability. When two or more kinds of granules are mixed before compression-molded or a lubricant is mixed, the mixture is preferably mixed for 5–10 minutes using an ordinary mixer. The lubricant is preferably a water soluble surfactant for a photographic processing tablet.

The solid processing tablet can be produced using compressors such as a hydraulic press machine, a single tableting machine, a rotary tableting machine and a briqueting machine. The rotary tableting machine is preferably used in view of mass production.

In a rotary tableting machine upper rod and lower rod are cylindrically arranged in a turn table. Granules are loaded by a hopper, compressed with the upper and lower rods and continuously tableted to prepare tablets. The process of compressing granules to tablets consist of a first process in which the upper and lower rods contact and apply pressure along a pressure roller, a second process in which the upper and lower rods move horizontally along the lowest end of the pressure roller and the uppermost end of the pressure roller and a third process in which compression is completed and tablets are removed. The time taken at the first process refers to kinetic compression time, and the time taken at the second process refers to compression dwell time. The sum of the both refers to total compression time. When the rotation speed of the turn table is high, the dwell time is short, and pressure strain in an inner portion of the tablets is not sufficiently relaxed and tablet expansion may occur. The tableting pressure, dwell time and loading amount are determined according to physical properties to be given to granules or tablets. However, the present invention is preferably carried out by the following conditions in view of a problem such as capping or lamination.

|  | Preferable | Especially Preferable |
|---|---|---|
| Tableting Pressure | 140–4300 kg/cm² | 700–2100 kg/cm² |
| Compression Dwell Time | 0.02–1.00 sec. | 0.05–0.80 sec. |

The shape of tablets may be in any form, but is preferably in cylindrical form in view of ease of producibility or processability. The diameter of the cylindrical tablet is optional according to the intended use, but preferably 10 to 35 mm in the invention.

EXAMPLES

The invention will be detailed in the following Examples, but is not limited thereto.

Example 1

| (Procedure 1) Preparation of a solid fixing composition for color negative film | |
|---|---|
| Ammonium thiosulfate/sodium thiosulfate (90/10 weight ratio) mixture | 60.0 kg |
| Sodium sulfite | 12.5 kg |
| Ethylenediaminetetraacetic acid disodium salt | 1.4 kg |
| Anhydrous potassium carbonate | 1.4 kg |

In a hammer-mill available on the market each of the above compounds was pulverized to a weight average particle diameter of 50 to 150 μm. The resulting powders were placed in a fluid-bed granulator (GPCG-Type 60 produced by Powrex Co., Ltd.) and fluidized in ambient air supplying additional 55° C. air in an amount of 40 m³/min. The supplied air was optionally dehumidified as shown in Table 1. After the temperature of exhaust air reached 45° C., a 20 weight % aqueous solution of Pineflow (produced by Matsutani Kagaku Co., Ltd.) was sprayed from a two fluid nozzle. The spraying rate was shown in Table 1. The air-for spraying was adjusted to give a 2700 gas/liquid ratio. The aqueous solution (binder water) was sprayed until the water reached 10 weight % of the powder. The temperature in the granulator was maintained at 43° C. while spraying. After the spraying, the fluidizing was continued for another hour and dried to obtain granules.

Ammonium thiosulfate/sodium thiosulfate (90/10, weight ratio) mixture of 100 kg was dressed by means of NEW SPEED MILL (produced by Okada Seiko Co., Ltd.) employing a 0.5 mm sieve. The resulting dressing particles, the above obtained granules and Soipon SLP (produced by Kawaken Fine Chemical Co., Ltd.) were mixed in an amount ratio of 300:200:1 (weight ratio) for 10 minutes in a cross rotary mixer available on the market.

The resulting mixture was tableted making use of a tableting machine including a piston and a cylinder, in which Clean Press Collect 18K produced by Kikusui Seisakusho Co., Ltd. was modified, at a tableting pressure of 1 ton/cm² and at a tableting dwell time of 0.05 second to obtain tablets having a diameter of 30 mm and a weight of 11.0 g.

(Procedure 2) Preparation of a bleach-fixing composition for color paper

In a hammer-mill available on the market 5.0 kg of sodium carbonate hydrate were pulverized to a particle size of 50 to 150 μm. The resulting powders and 75.0 kg of ferric sodium ethylenediaminetetraacetate trihydrate were placed in a fluid-bed granulator (GPCG-Type 60 produced by Powrex Co., Ltd.), and processed in the same manner as in Procedure 1, except that the dehumidifying of the supplying air and the spraying rate of the binder water were varied as shown in Table 2. Thus, granules A for bleach-fixing were obtained.

| | |
|---|---|
| Ammonium thiosulfate/sodium thiosulfate (90/10 weight ratio) mixture | 57.0 kg |
| Sodium metabisulfite | 21.8 kg |
| Sodium carbonate hydrate | 0.7 kg |

In a hammer-mill available on the market each of the above compounds was pulverized to a weight average particle diameter of 50 to 150 μm. The resulting powders were placed in a fluid-bed granulator (GPCG-Type 60 produced by Powrex Co., Ltd.) and processed in the same manner as in Procedure 1, except that the dehumidifying of the supplying air and the spraying rate of the binder water were varied as shown in Table 2. Thus, granules B for bleach-fixing were obtained.

The resulting granules A and B, powdered polyethylene glycol #4000, ethylenediamine tetraacetic acid and Soipon SLP (produced by Kawaken Fine Chemical Co., Ltd.) were mixed in an amount ratio of 70:120:10:3:1 for 10 minutes in a cross rotary mixer available on the market.

The resulting mixture was tableted using a tableting machine including a piston and a cylinder, in which Clean Press Collect 18K produced by Kikusui Seisakusho Co., Ltd. was modified, at a tableting pressure of 1 ton/cm$^2$ and at a tableting dwell time of 0.05 second to obtain tablets having a diameter of 30 mm and a weight of 11.0 g.

The theoretical relative humidity in the fluid bed granulator was obtained by the following calculation method.

The absolute moisture amount in the fluid bed granulator is represented as the sum of the moisture amount of air to be supplied and the moisture amount of the binder water sprayed. The absolute moisture amount of the air supplied (Y) is computed according to the following equation from temperature (t) and relative humidity at the inlet of the air to be supplied, assuming that there is no loss during heating and supplying.

Absolute moisture amount of air supplied Y (g/g)= saturated moisture amount at temperature t (g/g)×relative humidity H (%)/100.

The absolute moisture amount (Z) of a binder water sprayed is computed from the spraying rate (v) and the solid concentration (C) of a binder water, and the amount of air supplied (S) according to the following equation, assuming the binder water is immediately vaporized.

Absolute moisture amount Z (g/g) by spraying=spraying rate v (g/min)×{100-solid concentration C(%)}/100/air amount supplied S(g/min).

The air amount is usually measured in terms of volume per unit time (m$^3$/min), and then converted to weight from equation of state of gas PV=nRT, assuming air is an ideal gas having an average molecular weight of 28.8. P is 1 atm., V is the measured air amount (m$^3$/min), R is a gas constant, $8.2\times10^{-5}$ m$^3$·atm·K$^{-1}$·mol$^{-1}$, and T is absolute temperature (° C.+273) of the air supplied. Accordingly, The air amount S (g/min)=air amount (volume) V (m$^3$/min)× 28.8/($8.2\times10^{-5}$)/temperature of the air supplied T.

When, for example, the temperature of air supplied is 55° C. and the air amount is 40 m$^3$/min, the air amount supplied S (g/min) is 40×28.8/($8.2\times10^{-5}$)/(55+273)=42830.

Theoretical relative humidity (%) in the fluid bed= absolute moisture amount in the fluid bed X(g/g)/saturated moisture amount at temperature L in the fluid bed(g/g)× 100=(absolute moisture amount of air supplied Y (g/g)+ absolute moisture amount Z (g/g) by spraying)/saturated moisture amount at temperature L in the fluid bed×100.

The computed theoretical relative humidity is shown in Tables 1 and 2.

The following evaluation was carried out.

<Occurrence of fine powder>

One hundred grams of granules were screened with a 149 μm sieve according to JIS standard, and the granules minus sieve were weighed.

<Occurrence of large particles

One hundred and fifty grams of granules were screened with a 4000 μm sieve according to JIS Standard, and the granules plus sieve were weighed.

<Fluctuation of loading amount>

One tablet per 50 tablets produced by the tableting machine was weighed, and deviation from the desired weight was measured.

<Expansion degree of tablets>

After ten tablets were placed in aluminium foil laminated with a polyethylene film and stored at 50° C. and 60%RH for one month, the expansion degree of tablets was obtained by measuring the diameter of the tablets.

The results for color negative film are shown in Table 1, and results for color paper in Table 2.

TABLE 1

| Experiment No. | Air Supplied | Spraying Rate (g/min) | Relative Humidity in Granulator (%) | Fine Powder (%) | Bulky Particles (%) | Fluctuation of Loading Amount (%) | Expansion Degree of Tablets (%) | Remarks |
|---|---|---|---|---|---|---|---|---|
| 1-1 | 27° C., *90% | 1200 | 75 | 0.5 | 30.4 | ±5.1 | 2.8 | Comp. |
| 1-2 | " | 900 | 65 | 0.4 | 28.1 | ±4.5 | 2.5 | Comp. |
| 1-3 | " | 700 | 60 | 0.5 | 5.3 | ±1.7 | 0.7 | Inv. |
| 1-4 | " | 550 | 55 | 0.4 | 4.0 | ±1.5 | 0.8 | Inv. |
| 1-5 | " | 400 | 50 | 0.5 | 0.9 | ±0.7 | 0.2 | Inv. |
| 1-6 | " | 250 | 45 | 0.6 | 0.7 | ±0.5 | 0.2 | Inv. |
| 1-7 | dehumidifying at 20° C. | 850 | 55 | 0.4 | 4.8 | ±1.6 | 0.9 | Inv. |
| 1-8 | " | 700 | 50 | 0.4 | 1.2 | ±0.6 | 0.3 | Inv. |
| 1-9 | " | 550 | 45 | 0.6 | 0.8 | ±0.4 | 0.2 | Inv. |
| 1-10 | " | 400 | 40 | 0.4 | 0.6 | ±0.5 | 0.1 | Inv. |
| 1-11 | " | 250 | 35 | 0.7 | 0.6 | ±0.7 | 0.2 | Inv. |
| 1-12 | " | 100 | 30 | 0.8 | 0.4 | ±0.6 | 0.3 | Inv. |
| 1-13 | dehumidifying at 7° C. | 700 | 35 | 0.4 | 0.9 | ±0.6 | 0.2 | Inv. |
| 1-14 | " | 550 | 30 | 0.5 | 0.7 | ±0.4 | 0.1 | Inv. |
| 1-15 | " | 400 | 25 | 0.5 | 0.6 | ±0.5 | 0.2 | Inv. |
| 1-16 | " | 250 | 20 | 0.8 | 0.6 | ±0.6 | 0.3 | Inv. |
| 1-17 | " | 150 | 17 | 2.8 | 0.4 | ±1.5 | 0.7 | Inv. |
| 1-18 | " | 100 | 15 | 3.5 | 0.5 | ±1.8 | 0.9 | Inv. |
| 1-19 | " | 50 | 13 | 19.8 | 0.4 | ±4.4 | 3.2 | Comp. |

*Relative humidity

TABLE 2

| Experiment No. | Air Supplied | Spraying Rate (g/min) | Relative Humidity in Granulator (%) | Granules A Fine Powder (%) | Granules A Bulky Particles (%) | Granules B Fine Powder (%) | Granules B Bulky Particles (%) | Fluctuation of Loading Amount (%) | Expansion Degree of Tablets (%) | Remarks |
|---|---|---|---|---|---|---|---|---|---|---|
| 2-1 | 27° C., *90% | 1200 | 75 | 0.8 | 20.1 | 0.8 | 35.4 | ±5.8 | 2.2 | Comp. |
| 2-2 | " | 900 | 65 | 0.9 | 18.6 | 0.6 | 31.2 | ±5.3 | 2.1 | Comp. |
| 2-3 | " | 700 | 60 | 1.1 | 4.4 | 0.6 | 5.6 | ±1.9 | 0.8 | Inv. |
| 2-4 | " | 550 | 55 | 1.3 | 3.7 | 0.5 | 3.9 | ±1.7 | 0.7 | Inv. |
| 2-5 | " | 400 | 50 | 1.2 | 1.1 | 0.8 | 1.2 | ±0.6 | 0.2 | Inv. |
| 2-6 | " | 250 | 45 | 1.5 | 0.9 | 0.5 | 0.8 | ±0.7 | 0.2 | Inv. |
| 2-7 | Dehumidifying at 20° C. | 850 | 55 | 1.0 | 3.4 | 0.7 | 4.1 | ±1.8 | 0.8 | Inv. |
| 2-8 | " | 700 | 50 | 1.2 | 1.2 | 0.5 | 0.9 | ±0.7 | 0.2 | Inv. |
| 2-9 | " | 550 | 45 | 1.0 | 0.9 | 0.6 | 0.7 | ±0.6 | 0.1 | Inv. |
| 2-10 | " | 400 | 40 | 1.1 | 0.8 | 0.5 | 0.7 | ±0.5 | 0.1 | Inv. |
| 2-11 | " | 250 | 35 | 1.3 | 1.0 | 0.9 | 0.6 | ±0.6 | 0.1 | Inv. |
| 2-12 | " | 100 | 30 | 1.4 | 0.7 | 1.1 | 0.8 | ±0.7 | 0.2 | Inv. |
| 2-13 | Dehumidifying at 7° C. | 700 | 35 | 1.0 | 1.1 | 0.7 | 0.9 | ±0.6 | 0.1 | Inv. |
| 2-14 | " | 550 | 30 | 1.2 | 0.8 | 0.9 | 0.6 | ±0.5 | 0.1 | Inv. |
| 2-15 | " | 400 | 25 | 1.3 | 0.9 | 1.1 | 0.8 | ±0.7 | 0.2 | Inv. |
| 2-16 | " | 250 | 20 | 1.6 | 0.7 | 1.0 | 0.7 | ±0.9 | 0.2 | Inv. |
| 2-17 | " | 150 | 17 | 4.5 | 0.8 | 3.1 | 0.6 | ±1.7 | 0.7 | Inv. |
| 2-18 | " | 100 | 15 | 5.7 | 0.7 | 3.9 | 0.6 | ±1.9 | 0.9 | Inv. |
| 2-19 | " | 50 | 13 | 36.4 | 0.8 | 22.7 | 0.8 | ±4.9 | 2.9 | Comp. |

*Relative humidity

As is apparent from the above, the method of the invention gives superior production yield of granules, less occurrence of fine powder and fewer bulky particles, less fluctuation of loading amount at tableting and less tablet shape change after storage. The method is markedly effected when the relative humidity in the granulator is within a range of 20 to 50%.

Example 2

Granules and tablets were prepared in the same manner as Experiment No. 1-10 and No. 2-10 in Example 1, except that a pressure applying nozzle was used without air for spraying instead of the two fluid nozzle, and the resulting granules and tablets were evaluated in the same manner as in Example 1. The results were that bulky granule amount and fluctuation of loading amount deteriorate 50% or more as compared to the manufacturing method according to the two fluid nozzle. It has been proved that the two fluid nozzle is more advantageous.

Example 3

The fixing tablet for color negative film was prepared in Experiment Nos. 1 through 10 of Example 1, except that the gas/liquid ratio was adjusted as shown in Table 3. The resulting tablets were evaluated according to the following method.

<Reduction of tablet hardness>

After the hardness of ten tablets were measured using a hardness meter, in which a hardness meter produced by Okada Seikosho Co., Ltd. was modified, and the average hardness was calculated. After another ten tablets were placed in an aluminium foil laminated inside with a polyethylene film and stored at 50° C. and 60%RH for two weeks, the average hardness was similarly calculated.

The reduction of tablet hardness (%)=(hardness before storage–hardness after storage)/hardness before storage expansion.

<Occurrence of powder due to vibration>

Forty tablets were accommodated in a cartridge for Ecojet Chemicals produced by Konica Corporation, and placed in aluminium foil laminated with a polyethylene film and stored at 50° C. and 60%RH for one week. This sample was subjected to vibration testing using a vibration tester BF-UA (produced by IDEX Vo., Ltd.) at 5–67 Hz/10 min for one hour. The powder occurrence was calculated from the weight of tablets before and after the vibration test.

TABLE 3

| Experiment No. | Gas/Liquid Ratio | Reduction of Hardness | Powder Occurrence due to Vibration |
|---|---|---|---|
| 3-1 | 30 | 19 | 0.10 |
| 3-2 | 50 | 17 | 0.09 |
| 3-3 | 100 | 9 | 0.03 |
| 3-4 | 500 | 9 | 0.03 |
| 3-5 | 1000 | 4 | <0.01 |
| 3-6 | 2700 | 3 | <0.01 |
| 3-7 | 5000 | 5 | 0.01 |
| 3-8 | 7000 | 11 | 0.04 |
| 3-9 | 10000 | 10 | 0.03 |
| 3-10 | 20000 | 18 | 0.11 |
| 3-11 | 30000 | 21 | 0.13 |

As is apparent from Table 3, the method of the invention is free from hardness reduction and tablet abrasion when two nozzles are used and the gas/liquid ratio is 100 to 10,000. The tablets having a hardness reduction of not more than 30% and a powder occurrence of not more than 0.2% are not problematic for commercial use.

Example 4

As is apparent from comparison of Experiment No. 1-6 and No. 1-9 in Example 1, which employ the same relative humidity, spraying speed is higher and granulation can be carried out at a shorter time, when dehumidified air is supplied. After the spraying, time necessary to dry the resulting granules was measured using an infrared moisture meter available on the market. The drying time when dehumidified at 20° C. or less was more shortened, resulting in increase of production efficiency.

Example 5

The tablet samples were prepared in the same manner as in Experiment Nos. 1 through 10 of Example 1, except that the compounds were pulverized adjusting the rotation rate of the hammer mill to give granules having the weight average particle diameter as shown in Table 4. The resulting fixing tablets for color negative film were evaluated for reduction of hardness, and powder occurrence due to vibration. The results are shown in Table 4. The weight average particle diameter was calculated using a sieving method.

TABLE 4

| Experiment No. | Weight Average Particle Diameter (μm) | Reduction of Hardness (%) | Powder Occurrence due to Vibration (%) |
|---|---|---|---|
| 4-1 | 18 | 11 | 0.12 |
| 4-2 | 20 | 6 | 0.02 |
| 4-3 | 50 | 5 | 0.01 |
| 4-4 | 76 | 3 | <0.01 |
| 4-5 | 103 | 3 | <0.01 |
| 4-6 | 150 | 4 | <0.01 |
| 4-7 | 216 | 5 | 0.01 |
| 4-8 | 350 | 5 | 0.01 |
| 4-9 | 420 | 14 | 0.09 |
| 4-10 | *700 | 19 | 0.08 |

*Material was used as it is.

As is apparent from the above, the method of the invention prevents hardness reduction and tablet abrasion when employing granules having a weight average particle diameter of 20 to 350 μm, and gives superior results.

Example 6

The bleach fixing tablets for color paper were prepared in the same manner as in Experiment Nos. 2 through 10 of Example 1, except that the spraying amount of binder water relative to the compounds used was varied as shown in Table 5. The resulting tablets were evaluated for reduction of hardness and powder occurrence due to vibration. The results are shown in Table 5.

TABLE 5

| Experiment No. | Binder Water Amount (Weight %) based on the powder used | Reduction of Hardness (%) | Powder Occurrence due to Vibration (%) |
|---|---|---|---|
| 5-1 | 0.1 | 18 | 0.14 |
| 5-2 | 0.5 | 14 | 0.12 |
| 5-3 | 1.0 | 8 | 0.04 |
| 5-4 | 2.0 | 7 | 0.03 |
| 5-5 | 5.0 | 4 | <0.01 |
| 5-6 | 10.0 | 3 | <0.01 |
| 5-7 | 15.0 | 3 | <0.01 |
| 5-8 | 25.0 | 4 | 0.01 |
| 5-9 | 30.0 | 8 | 0.04 |
| 5-10 | 50.0 | 9 | 0.03 |
| 5-11 | 60.0 | 15 | 0.09 |
| 5-12 | 80.0 | 16 | 0.10 |

As is apparent from Table 5, the method of the invention is markedly effected when the spraying binder water amount is 1.0 to 50 weight %.

Example 7

The fixing tablets for color negative film were prepared in the same manner as in Experiment Nos. 1 through 10 of Example 1, except that both kinds and concentration of the binder in the spraying binder water were varied as shown in Table 6. The resulting fixing tablets were evaluated for reduction of hardness, powder occurrence due to vibration, and blocking of granules.

<Blocking of Granules>

One kilogram of granules is tightly sealed in a polyethylene package, and stored at 25° C. and 70%RH for one week. Thereafter, the resulting granules were screened with a 4000 μm sieve according to JIS Standard and the blocks plus sieve were weighed.

TABLE 6

| Experiment No. | Binder | Solid Concentration (%) | Blocking of Granules (%) | Fluctuation of Loading Amount (%) | Expansion Degree of Tablets (%) |
|---|---|---|---|---|---|
| 6-1 | pineflow | 0.1 | 2.3 | ±1.7 | 0.7 |
| 6-2 | pineflow | 0.5 | 2.1 | ±1.5 | 0.8 |
| 6-3 | pineflow | 1.0 | 0.7 | ±0.9 | 0.4 |
| 6-4 | pineflow | 2.0 | 0.6 | ±0.9 | 0.3 |
| 6-5 | pineflow | 5.0 | 0.2 | ±0.5 | 0.1 |
| 6-6 | pineflow | 10 | 0.1 | ±0.4 | 0.1 |
| 6-7 | pineflow | 20 | 0.2 | ±0.5 | 0.1 |
| 6-8 | pineflow | 30 | 0.2 | ±0.5 | 0.1 |
| 6-9 | pineflow | 40 | 0.6 | ±0.9 | 0.3 |
| 6-10 | pineflow | 60 | 0.7 | ±1.0 | 0.4 |
| 6-11 | pineflow | 70 | 4.2 | ±1.8 | 0.4 |
| 6-12 | sorbitol | 0.1 | 2.4 | ±1.8 | 0.7 |
| 6-13 | sorbitol | 0.5 | 2.0 | ±1.7 | 0.8 |
| 6-14 | sorbitol | 1.0 | 0.7 | ±0.9 | 0.3 |
| 6-15 | sorbitol | 2.0 | 0.6 | ±0.8 | 0.4 |
| 6-16 | sorbitol | 5.0 | 0.6 | ±0.5 | 0.1 |
| 6-17 | sorbitol | 10 | 0.5 | ±0.4 | 0.1 |
| 6-18 | sorbitol | 20 | 0.5 | ±0.5 | 0.1 |
| 6-19 | sorbitol | 30 | 0.6 | ±0.5 | 0.1 |
| 6-20 | sorbitol | 40 | 1.2 | ±1.0 | 0.3 |
| 6-21 | sorbitol | 60 | 1.1 | ±1.1 | 0.4 |
| 6-22 | sorbitol | 70 | 8.9 | ±1.8 | 0.6 |

As is apparent from the above, the method of the invention is markedly effected when the binder concentration of the spraying binder water is 1.0 to 60 weight %.

Example 8

A solid fixing composition for color negative film was prepared according to the following procedures.
(Procedure 3)

| | |
|---|---|
| Ammonium thiosulfate/sodium thiosulfate (90/10 weight ratio) mixture | 60.0 kg |
| Sodium sulfite | 12.5 kg |
| Ethylenediaminetetraacetic acid disodium salt | 1.4 kg |
| Anhydrous potassium carbonate | 1.4 kg |

In a hammer-mill available on the market each of the above compounds was pulverized to a weight average particle diameter as shown in Table 7. The resulting powders were placed in a fluid-bed granulator (GPCG-Type 60 produced by Powrex Co., Ltd.) and fluidized in air current, supplying air whose temperature and supplying amount are adjusted as shown in Table 7. The absolute moisture amount of supplied air was 0.0145 kgH$_2$O/kg, the area of the flow adjusting plate was 0.415 m$^2$, and aperture rate was 8%.
(Procedure 4)

After the temperature in the granulator reached temperature as shown in Table 7, a 20 weight % aqueous solution of Pineflow (produced by Matsutani Kagaku Co., Ltd.) was sprayed from a two fluid nozzle. The spraying rate was g/min., and spraying was adjusted to give a 2700 gas/liquid ratio. The aqueous solution (binder water) was sprayed until the water reached 10 weight % of the powder.

After the spraying, the fluidizing was continued for another hour and dried to obtain granules.

(Procedure 5)

Ammonium thiosulfate/sodium thiosulfate (90/10, weight ratio) mixture of 100 kg was dressed by means of NEW SPEED MILL (produced by Okada Seiko Co., Ltd.) employing a 0.5 mm sieve. The resulting dressing particles, granules obtained by Procedure 3 or 4 and Soipon SLP (produced by Kawaken Fine Chemical Co., Ltd.) were mixed in an amount ratio of 300:200:1 for about 10 minutes in a cross rotary mixer available on the market.

(Procedure 6)

The resulting mixture was tableted making use of a tableting machine, in which Clean Press Collect 18K produced by Kikusui Seisakusho Co., Ltd. was modified, at a tableting pressure of 1400 kg/cm², at a rotation rate of turn table of 10 rpm and at a tableting dwell time of 0.05 second to obtain tablets having a diameter of 30 mm and a weight of 11.0 g.

The following evaluation was carried out.

<Yield of granules>

After the drying, the yield of granules was computed from weight of obtained granules and weight of components initially used.

<Occurrence of fine powder>

One hundred and fifty grams of granules were screened with a 149 μm sieve according to JIS standard, and the granules minus sieve were weighed.

<Adhesion of the powder to the inner walls of granulator>

After drying, adhesion of powder to the inner walls was observed. The evaluation criteria was as follows:

◎: No powder adherence to the inner walls.

○: Slight powder adherence to the upper inner walls, but all the powder fell at tapping.

△: Powder adherence was observed at the upper and lower inner walls, and powder did not fall at tapping.

X : Powder adherence was observed over the entire inner walls of the granulator and in the dust collector filter.

<Fluctuation of loading amount>

One tablet per 50 tablets produced by the tableting machine was weighed, and deviation from the desired weight was measured.

The results are shown in Table 7.

In view of the above, it has been proved that the method of the invention is superior in production yield of granules, occurrence of fine powder, adhesion to the inner walls and fluctuation of loading amount at tableting.

Example 9

The same procedures as Experiment No. 7-9 of Example 8 were carried out, except that air for spraying was adjusted to give a gas/liquid ratio as shown in Table 8. The following evaluation was carried out. The results are shown in Table 8.

<Capping rate>

Using a dria coater DRC500 (produced by Powrex Co., Ltd.), 500 tablets were rotated at a peripheral speed of 15 rpm for 20 minutes, and then seperated tablets were counted.

TABLE 8

| Experiment No. | Gas/liquid ratio | Capping Rate (tablets/500 tablets) |
| --- | --- | --- |
| 8-1 | 80 | 8 |
| 8-2 | 100 | 3 |
| 8-3 | 1000 | 0 |
| 8-4 | 3000 | 0 |
| 8-5 | 5000 | 0 |
| 8-6 | 7500 | 2 |
| 8-7 | 10000 | 2 |
| 8-8 | 11000 | 6 |

Table 8 shows that the manufacturing method of the invention gives superior capping property, and is especially advantageous in the gas/liquid ratio range of 100 to 10,000.

Example 10

The same procedure as in Experiment No. 7-9 of Example 8 was carried out, except that a Pineflow concentration of binder water was varied as shown in Table 9. The resulting samples were evaluated for adhesion to the inner walls, expansion degree of tablets, fine powder occurrence due to vibration testing and blocking of granules. The results are shown in Table 9.

<Expansion degree of tablets>

After ten tablets were placed in aluminium foil laminated with a polyethylene film and stored at 50° C. and 90%RH for 1.2 months, the expansion degree of tablets was obtained by measuring the diameter of the tablets.

TABLE 7

| Experiment No. | Weight Average Particle Diameter of Particles (μm) | Temperature at granulation (°C.) | Yield of Granules (wt %) | Fine Powder Occurrence (wt %) | Powder Adhesion to Inner Walls | Fluctuation of Loading Amount (%) | Remarks |
| --- | --- | --- | --- | --- | --- | --- | --- |
| 7-1 | 18 | 15 | 46 | 80 | XX | ±22.0 | Comp. |
| 7-2 | 18 | 50 | 52 | 72 | XX | ±19.6 | Comp. |
| 7-3 | 20 | 15 | 53 | 70 | X | ±20.0 | Comp. |
| 7-4 | 20 | 50 | 90 | 5 | O | ±0.6 | Inv. |
| 7-5 | 50 | 15 | 56 | 65 | X | ±12.8 | Comp. |
| 7-6 | 50 | 50 | 92 | 2 | ◎ | ±0.2 | Inv. |
| 7-7 | 150 | 15 | 60 | 50 | X | ±10.9 | Comp. |
| 7-8 | 150 | 20 | 85 | 8 | O | ±0.7 | Inv. |
| 7-9 | 150 | 50 | 94 | <1 | ◎ | ±0.1 | Inv. |
| 7-10 | 150 | 80 | 94 | <1 | O | ±0.6 | Inv. |
| 7-11 | 150 | 86 | 82 | 46 | XX | ±9.8 | Comp. |
| 7-12 | 350 | 15 | 79 | 39 | X | ±8.3 | Comp. |
| 7-13 | 350 | 50 | 86 | 2 | O | ±0.5 | Inv. |
| 7-14 | 370 | 15 | 52 | 46 | XX | ±6.9 | Comp. |
| 7-15 | 370 | 50 | 58 | 43 | XX | ±6.0 | Comp. |

<Occurrence of powder due to vibration>

Forty tablets were accommodated in a cartridge for Ecojet Chemicals produced by Konica Corporation, and placed in aluminium foil laminated with a polyethylene film and stored at 50° C. and 85%RH for one week. This sample was subjected to vibration testing using a vibration tester BF-UA (produced by IDEX Vo., Ltd.) at 5–67 Hz/210 sec. for 35 minutes. The powder occurrence was calculated from the weight of tablets before and after the vibration test.

<Blocking of Granules>

One kilogram of granules is tightly sealed in a polyethylene package, further tightly sealed in a Toflon vessel, and stored at 50° C. and 90%RH for six days. Thereafter, the resulting granules were screened with a 2,000 μm sieve according to JIS Standard and the blocks plus sieve were weighed.

TABLE 9

| Experiment No. | Concentration of Pineflow (wt %) | Adhesion to Inner Walls | Expansion Degree of Tablets (%) | Fine Powder Occurrence (wt %) | Blocking (wt %) |
|---|---|---|---|---|---|
| 9-1 | 0.5 | ○ | 0.9 | 0.06 | 2.1 |
| 9-2 | 1.0 | ◉ | 0.6 | 0.02 | 0.8 |
| 9-3 | 15 | ◉ | 0.2 | <0.01 | <0.1 |
| 9-4 | 30 | ◉ | 0.2 | <0.01 | <0.1 |
| 9-5 | 60 | ◉ | 0.2 | <0.01 | <0.1 |
| 9-6 | 65 | △ | 0.2 | <0.01 | 4.0 |

As is apparent from the above, when the binder concentration of the binder water to be sprayed is in the range of 1.0 to 60 weight %, adhesion to the inner walls, blocking of granules and expansion of tablets during storage can be effectively prevented, and tablet strength is excellent.

Example 11

The same procedure as in Experiment No. 7-9 of Example 8 was carried out, except that the dwell time in tableting were varied, by adjusting the rotation rate of a turn table, as shown in Table 10. The resulting samples were evaluated for capping rate, expansion degree of tablets, and fine powder occurrence due to vibration testing. The results are shown in Table 10.

TABLE 10

| Experiment No. | Dwell Time in Tableting (second) | Capping Rate (tablets/500 tablets) | Expansion Degree of Tablets (%) | Fine Powder Occurrence (wt %) |
|---|---|---|---|---|
| 10-1 | 0.01 | 3 | 0.8 | 0.07 |
| 10-2 | 0.02 | 1 | 0.5 | 0.03 |
| 10-3 | 0.05 | 0 | 0.2 | <0.01 |
| 10-4 | 0.50 | 0 | 0.2 | <0.01 |
| 10-5 | 0.80 | 0 | 0.2 | <0.01 |
| 10-6 | 1.00 | 1 | 0.4 | 0.02 |
| 10-7 | 1.10 | 3 | 0.9 | 0.06 |

As is apparent from the above, when tableting, at the dwell time within the range of 0.02 to 1.0 second, granules produced according to the granulating method of the invention, capping and expansion of tablets can be effectively prevented, and obtained tablets have superior hardness.

Example 12

A bleach-fixing composition for color paper was prepared according to the following procedure.

(Procedure 7)

In a hammer-mill available on the market 5.0 kg of sodium carbonate hydrate were pulverized and mixed with 75.0 kg of ferric sodium ethylenediaminetetraacetate trihydrate to a weight average particle diameter shown in Table 11. The resulting powders were placed in a fluid-bed granulator (GPCG-Type 60 produced by Powrex Co., Ltd.), and granulated in the same manner as in Procedures 3 through 5, except for temperature. Thus, granules A' for bleach-fixing were obtained.

(Procedure 8)

| | |
|---|---|
| Ammonium thiosulfate/sodium thiosulfate (90/10 weight ratio) mixture | 57.0 kg |
| Sodium metabisulfite | 21.0 kg |
| Sodium carbonate hydrate | 0.7 kg |

In a hammer-mill available on the market each of the above compounds was pulverized to give their mixture having a weight average particle diameter as shown in Table 11 of 50 to 150 μm. The resulting powders were placed in a fluid-bed granulator (GPCG-Type 60 produced by Powrex Co., Ltd.), and granulated in the same manner as in Procedures 3 through 5, except for temperature. Thus, granules B' for bleach-fixing were obtained.

The resulting granules were similarly evaluated for yield of granules, fine powder occurrence, adhesion to the inner walls, and blocking of granules. The results are shown in Table 11.

TABLE 11

| Experiment No. | Kinds of Granules | Weight Average Particle Diameter of Particles (μm) | Temperature at granulation (°C.) | Yield of Granules (wt %) | Fine Powder Occurrence (wt %) | Powder Adhesion to Inner Walls | Blocking of Granules (%) | Remarks |
|---|---|---|---|---|---|---|---|---|
| 11-1  | A'-1  | 15  | 50 | 38 | 76 | XX | 59.3 | Comp. |
| 11-2  | A'-2  | 20  | 50 | 89 | 6  | O  | 1.8  | Inv.  |
| 11-3  | A'-3  | 50  | 15 | 40 | 70 | X  | 40.3 | Comp. |
| 11-4  | A'-4  | 50  | 50 | 91 | 3  | ⊙  | <0.1 | Inv.  |
| 11-5  | A'-5  | 150 | 15 | 51 | 55 | X  | 43.1 | Comp. |
| 11-6  | A'-6  | 150 | 20 | 84 | 9  | O  | 1.5  | Inv.  |
| 11-7  | A'-7  | 150 | 50 | 93 | 1  | ⊙  | <0.1 | Inv.  |
| 11-8  | A'-8  | 150 | 80 | 93 | 1  | O  | 1.6  | Inv.  |
| 11-9  | A'-9  | 150 | 85 | 79 | 53 | XX | 38.2 | Comp. |
| 11-10 | A'-10 | 350 | 15 | 70 | 47 | X  | 40.0 | Comp. |
| 11-11 | A'-11 | 350 | 50 | 85 | 3  | O  | 1.6  | Inv.  |
| 11-12 | A'-12 | 370 | 50 | 40 | 50 | XX | 44.1 | Comp. |
| 11-13 | B'-1  | 15  | 50 | 51 | 70 | XX | 64.0 | Comp. |
| 11-14 | B'-2  | 20  | 50 | 90 | 5  | O  | 1.9  | Inv.  |
| 11-15 | B'-3  | 50  | 15 | 54 | 65 | X  | 49.6 | Comp. |
| 11-16 | B'-4  | 50  | 50 | 92 | 2  | ⊙  | <0.1 | Inv.  |
| 11-17 | B'-5  | 150 | 15 | 60 | 49 | X  | 48.9 | Comp. |
| 11-18 | B'-6  | 150 | 20 | 85 | 8  | O  | 1.6  | Inv.  |
| 11-19 | B'-7  | 150 | 50 | 93 | <1 | ⊙  | <0.1 | Inv.  |
| 11-20 | B'-8  | 150 | 80 | 93 | <1 | O  | 1.7  | Inv.  |
| 11-21 | B'-9  | 150 | 85 | 82 | 46 | XX | 39.9 | Comp. |
| 11-22 | B'-10 | 350 | 15 | 79 | 39 | X  | 43.6 | Comp. |
| 11-23 | B'-11 | 350 | 50 | 86 | 2  | O  | 1.8  | Inv.  |
| 11-24 | B'-12 | 370 | 50 | 59 | 44 | XX | 48.0 | Comp. |

As is apparent from the above, the manufacturing method of the invention has superior productivity also in solid bleach-fixing composition.

Example 13

(Procedure 9)

The resulting granules A' and B', powdered polyethylene glycol #4000, ethylenediamine tetraacetic acid and Soipon SLP (produced by Kawaken Fine Chemical Co., Ltd.) were mixed in an amount ratio of 70:120:10:3:1 for 10 minutes in a cross rotary mixer available on the market in combination shown in Table 12.

The resulting mixture was tableted using a tableting machine, in which Clean Press Collect 18K produced by Kikusui Seisakusho Co., Ltd. was modified, at the same tableting conditions as Procedure 10.

The resulting tablets were evaluated in the same manner as in Example 11. The results are shown in Table 12.

TABLE 12

| Experiment No. | Blended Granules | Capping Rate (tablets/500 tablets) | Expansion Degree of Tablets (%) | Fine Powder Occurrence (wt %) | Remarks |
|---|---|---|---|---|---|
| 12-1 | (A'-1) or (B'-1)   | 49 | 3.6 | 6.8   | Comp  |
| 12-2 | (A'-3) or (B'-3)   | 46 | 3.7 | 7.3   | Comp. |
| 12-3 | (A'-7) or (B'-7)   | 0  | 0.2 | <0.01 | Inv.  |
| 12-4 | (A'-8) or (B'-8)   | 0  | 0.2 | <0.01 | Inv.  |
| 12-5 | (A'-11) or (B'-11) | 0  | 0.2 | <0.01 | Inv.  |
| 12-6 | (A'-12) or (B'-12) | 48 | 4.1 | 8.1   | Comp. |
| 12-7 | (A'-8) or (B'-1)   | 31 | 3.8 | 7.6   | Comp. |
| 12-8 | (A'-8) or (B'-12)  | 33 | 3.9 | 9.0   | Comp. |

As is apparent from the above, tablets obtained by compression molding granules produced according to the manufacturing method of the invention has superior properties also in solid bleach-fixing composition.

Example 14

A solid fixing composition for color negative film was prepared according to the following procedures.
(Procedure 10)

| | |
|---|---|
| Ammonium thiosulfate/sodium thiosulfate (90/10 weight ratio) mixture | 60.0 kg |
| Sodium sulfite | 12.5 kg |
| Ethylenediaminetetraacetic acid disodium salt | 1.4 kg |
| Anhydrous potassium carbonate | 1.4 kg |

In a hammer-mill available on the market each of the above compounds was pulverized to 50 to 150 μm of a weight average particle diameter. The resulting powders were placed in a fluid-bed granulator (GPCG-Type 60 produced by Powrex Co., Ltd.) and fluidized in 55° C. air, supplying air at a supplying amount as shown in Table 13. The area of the flow adjusting plate was 0.415 m², and aperture rate was 8%.

(Procedure 11)

After the temperature in the granulator reached 45° C., a 20 weight % aqueous solution of Pineflow (produced by Matsutani Kagaku Co., Ltd.) was sprayed from a two fluid nozzle. The spraying rate was 300 g/min., and air for spraying was adjusted to give a 2700 gas/liquid ratio. The aqueous solution (binder water) was sprayed until the water reached 10 weight % of the powder. After the spraying, the fluidizing was continued for another hour and dried to obtain granules.

(Procedure 12)

Ammonium thiosulfate/sodium thiosulfate (90/10, weight ratio) mixture of 100 kg was dressed by means of NEW SPEED MILL (produced by Okada Seiko Co., Ltd.) employing a 0.5 mm sieve. The resulting dressing particles, granules obtained by Procedure 1 or 2 and Soipon SLP (produced by Kawaken Fine Chemical Co., Ltd.) were mixed in an amount ratio of 300:200:1 for about 10 minutes in a cross rotary mixer available on the market.

(Procedure 13)

The resulting mixture was tableted with a cylinder and a piston, using a tableting machine, in which Clean Press Collect 18K produced by Kikusui Seisakusho Co., Ltd. was modified, at a tableting pressure of 1400 kg/cm$^2$, at a rotation rate of turn table of 10 rpm and at a tableting dwell time of 0.05 second to obtain tablets having a diameter of 30 mm and a weight of 11.0 g.

The following evaluation was carried out.

<Yield of granules>

After the drying, the yield of granules was computed from weight of obtained granules and weight of components initially used.

<Occurrence of fine powder>

One hundred and fifty grams of granules were screened with a 149 μm sieve according to JIS standard, and the granules minus sieve were weighed.

<Adhesion of powder to the inner walls of the granulator>

After drying, adhesion of powder to the inner walls was observed. The evaluation criteria was as follows:

⊚: No powder adherence to the inner walls.

○: Slight powder adherence to the upper inner walls, but all the powder fell at tapping.

Δ: Powder adherence was observed at the upper and lower inner walls, and powder did not fall at tapping.

X: Powder adherence was observed over the entire inner walls of the granulator and in the dust collector filter.

<Occurrence of large particles>

One hundred and fifty grams of granules were screened with a 4000 μm sieve according to JIS Standard, and the granules plus sieve were weighed.

<Fluctuation of loading amount>

One tablet per 50 tablets produced by the tableting machine was weighed, and deviation from the desired weight was measured.

The results are shown in Table 13.

In view of the above, it has been proved that the method of the invention is superior in production yield of granules, occurrence of fine powder, amount of large particles, powder adhesion to the cylinder and fluctuation of loading amount at tableting. Especially when at 0.5 to 3.0 m/sec., the invention is remarkably effected.

Example 15

The same procedures as Example 14 were carried out, except that the aqueous solution was sprayed from a pressure nozzle instead of a two fluid nozzle, without using air for spraying. The resulting granule and tablet samples were evaluated in the same manner as in Example 14. The large particle occurrence and fluctuation of loading amount both deteriorate 40% or more throughout all the airflow speed, and it has been proved that the manufacturing method of the invention is more advantageous.

Example 16

The same procedures as Experiment No. 13-5 of Example 14 were carried out, except that air for spraying was adjusted to give a gas/liquid ratio as shown in Table 14. The following evaluation was carried out. The results are shown in Table 14.

<Capping rate>

Using a dria coater DRC 500 produced by Powrex Co., Ltd.), 500 tablets were rotated at a peripheral speed of 15 rpm for 15 minutes, and then seperated tablets were counted.

TABLE 14

| Experiment No. | Gas/Liquid ratio | Capping Rate (tablets/500 tablets) | Remarks |
| --- | --- | --- | --- |
| 14-1 | 20 | 12 | Invention |
| 14-2 | 50 | 10 | Invention |
| 14-3 | 100 | 2 | Invention |
| 14-4 | 500 | 2 | Invention |
| 14-5 | 1000 | 0 | Invention |
| 14-6 | 2700 | 0 | Invention |
| 14-7 | 5000 | 0 | Invention |
| 14-8 | 7000 | 2 | Invention |
| 14-9 | 10000 | 3 | Invention |
| 14-10 | 20000 | 9 | Invention |
| 14-11 | 50000 | 11 | Invention |

Table 14 shows that the manufacturing method of the invention gives superior capping property, and is especially advantageous in the gas/liquid ratio range of 100 to 10,000.

Example 15

The same procedures as Experiment No. 13-5 of Example 14 were carried out, except that a mixture of ammonium

TABLE 13

| Experiment No. | Airflow Speed (m/sec.) | Yield of Granules (wt %) | Fine Powder Occurrence (wt %) | Amount of Large Particles (wt %) | Powder Adhesion to Inner Walls | Fluctuation of Loading Amount (%) | Remarks |
| --- | --- | --- | --- | --- | --- | --- | --- |
| 13-1 | 0.01 | 81 | 2.0 | 10.9 | X | ±4.5 | Comparative |
| 13-2 | 0.05 | 82 | 1.0 | 9.8 | X | ±4.3 | Comparative |
| 13-3 | 0.10 | 93 | 0.3 | 1.0 | ○ | ±1.0 | Invention |
| 13-4 | 0.50 | 97 | 0.3 | 0.7 | ⊚ | ±0.7 | Invention |
| 13-5 | 1.00 | 99 | 0.4 | 0.6 | ⊚ | ±0.5 | Invention |
| 13-6 | 2.00 | 99 | 0.5 | 0.8 | ⊚ | ±0.4 | Invention |
| 13-7 | 3.00 | 97 | 0.5 | 0.9 | ⊚ | ±0.3 | Invention |
| 13-8 | 5.00 | 93 | 1.0 | 1.0 | ○ | ±0.7 | Invention |
| 13-9 | 7.00 | 60 | 11.5 | 1.8 | X | ±3.6 | Comparative |
| 13-10 | 10.00 | 59 | 12.7 | 2.0 | XX | ±3.9 | Comparative | thiosulfate and sodium thiosulfate (90:10, weight ratio) and ethylenediamine disodium salt were varied in the amount to give a ratio of the mixture to the total granule weight as shown in Table 15, and sodium sulfite and anhydrous sodium carbonate were not added. The following evaluation was carried out, and the results are shown in Table 15.

<Expansion degree of tablets>

After ten tablets were placed in aluminium foil laminated with a polyethylene film and stored at 50° C. and 80%RH for one month, the expansion degree of tablets was obtained measuring the diameter of the tablets.

<Occurrence of powder due to vibration>

Forty tablets were accommodated in a cartridge for Ecojet Chemicals produced by Konica Corporation, and placed in aluminium foil laminated with a polyethylene film and stored at 50° C. and 80%RH for two weeks. This sample was subjected to vibration testing using a vibration tester BF-UA (produced by IDEX Vo., Ltd.) at 5–67 Hz/210 sec. for 30 minutes. The powder occurrence was calculated from the weight of tablets before and after the vibration test.

As is apparent from the above, when the method employing powder particles having a weight average particle diameter of 20 to 350 μm is superior in yield of granules, adhesion to cylinder, and expansion degree of tablets after storage, and is excellent in the effects of the invention.

Example 19

The same procedure as in Experiment No. 13-5 of Example 14 was carried out, except that the components used were increased by 20 weight % and the aperture was adjusted as shown in Table 5 by varying the number of the flow adjusting plate. The resulting samples were evaluated in the same manner as in Example 14. The results are shown in Table 17.

TABLE 15

| Experiment No. | Ratio of Mixture of Ammonium Thiosulfate and Sodium Thiosulfate (90:10, weight ratio) to total Granule Weight (wt %) | Expansion Degree of Tablets (%) | Fine Powder Occurrence due to Vibration (wt %) | Remarks |
| --- | --- | --- | --- | --- |
| 15-1 | 0.1 | 3.0 | 0.15 | Invention |
| 15-2 | 1.0 | 2.8 | 0.13 | Invention |
| 15-3 | 5.0 | 0.8 | 0.05 | Invention |
| 15-4 | 10.0 | 0.7 | 0.05 | Invention |
| 15-5 | 30.0 | 0.2 | 0.07 | Invention |
| 15-6 | 50.0 | 0.2 | 0.01 | Invention |
| 15-7 | 90.0 | 0.2 | 0.01 | Invention |
| 15-8 | 98.0 | 0.1 | 0.01 | Invention |
| 15-9 | 100.0 | 0.1 | 0.01 | Invention |

As is apparent from the above, tablets containing 5 weight % or more of the compounds of the invention, which are produced by compression molding granules obtained by the manufacturing method of the invention, have no expansion after storage and no fine powder occurrence due to vibration.

Example 18

The same procedure as in Experiment No. 13-5 of Example 14 was carried out, except that powder particles shown in Table 16, which were obtained by varying rotation rate of the mill, were use. The resulting samples were evaluated for yield of granules, adhesion to the inner walls, and expansion degree of tablets. The results are shown in Table 16.

TABLE 16

| Experiment No. | Weight Average Particle Diameter (μm) | Yield of the Granules (wt %) | Powder Adhesion to Inner Walls | Expansion Degree of Tablets (%) | Remarks |
| --- | --- | --- | --- | --- | --- |
| 16-1 | 18 | 87 | ○ | 0.3 | Invention |
| 16-2 | 20 | 97 | ○ | 0.2 | Invention |
| 16-3 | 50 | 97 | ⊙ | 0.2 | Invention |
| 16-4 | 76 | 98 | ⊙ | 0.2 | Invention |
| 16-5 | 103 | 99 | ⊙ | 0.1 | Invention |
| 16-6 | 150 | 99 | ⊙ | 0.1 | Invention |
| 16-7 | 216 | 99 | ○ | 0.7 | Invention |
| 16-8 | 350 | 99 | ○ | 0.8 | Invention |
| 16-9 | *700 | 88 | ○ | 2.0 | Invention |

*Materials were used as they are.

TABLE 17

| Experiment No. | Aperture of Flow Adjusting Plate (%) | Yield of Granules (wt %) | Fine Powder Occurrence (wt %) | Amount of Large Particles (wt %) | Powder Adhesion to Inner Walls | Fluctuation of Loading Amount (%) | Remarks |
| --- | --- | --- | --- | --- | --- | --- | --- |
| 17-1 | 0.5  | 90 | 2.0 | 0.5 | ○ | ±0.7 | Invention |
| 17-2 | 1.0  | 98 | 0.5 | 0.5 | ⊙ | ±0.6 | Invention |
| 17-3 | 5.0  | 98 | 0.5 | 0.5 | ⊙ | ±0.5 | Invention |
| 17-4 | 8.0  | 99 | 0.4 | 0.6 | ⊙ | ±0.5 | Invention |
| 17-5 | 10.0 | 98 | 0.3 | 0.8 | ⊙ | ±0.4 | Invention |
| 17-6 | 15.0 | 98 | 0.3 | 0.9 | ⊙ | ±0.5 | Invention |
| 17-7 | 20.0 | 95 | 0.3 | 1.0 | ⊙ | ±0.6 | Invention |
| 17-8 | 50.0 | 94 | 0.3 | 1.8 | ○ | ±3.0 | Invention |
| 17-9 | 70.0 | 94 | 0.2 | 2.0 | ○ | ±3.2 | Invention |

Table 17 shows that when the components used were increased by 20 weight %, the method gives the same results as in Example 14, and the aperture of 8 to 20% is excellent in the effects of the invention.

Example 20

The same procedure as in Experiment No. 13-5 of Example 14 was carried out, except that air supplying amount/spraying rate was varied as shown in Table 18, the air supplying amount being maintained constant. The resulting samples were evaluated in the same manner as in Example 14. The results are shown in Table 18.

binder water was varied as shown in Table 19. The resulting samples were evaluated for fine powder occurrence, powder adhesion to the inner walls, amount of large particles, expansion degree of tablets, and further the following.

<Blocking of Granules>

One kilogram of granules is tightly sealed in a polyethylene package, further tightly sealed in a Toflon vessel, and stored at 50° C. and 80%RH for two weeks. Thereafter, the resulting granules were screened with a 4,000 μm sieve according to JIS Standard and the blocks plus sieve were weighed.

The results are shown in Table 19.

TABLE 18

| Experiment No. | Air Supplying Amount/ Spraying Rate (g/m³) | Yield of Granules (wt %) | Fine Powder Occurrence (wt %) | Amount of Large Particles (wt %) | Powder Adhesion to Inner Walls | Fluctuation of Loading Amount (%) | Remarks |
| --- | --- | --- | --- | --- | --- | --- | --- |
| 18-1 | 0.5  | 90 | 2.0 | 0.4 | ○ | ±2.6 | Invention |
| 18-2 | 1.0  | 97 | 0.5 | 0.4 | ○ | ±0.9 | Invention |
| 18-3 | 5.0  | 97 | 0.5 | 0.5 | ⊙ | ±0.5 | Invention |
| 18-4 | 7.5  | 99 | 0.4 | 0.6 | ⊙ | ±0.5 | Invention |
| 18-5 | 15.0 | 98 | 0.3 | 0.6 | ⊙ | ±0.4 | Invention |
| 18-6 | 20.0 | 98 | 0.2 | 0.7 | ○ | ±0.8 | Invention |
| 18-7 | 30.0 | 89 | 0.2 | 2.8 | ○ | ±1.5 | Invention |
| 18-8 | 50.0 | 87 | 0.2 | 2.9 | ○ | ±2.3 | Invention |

As is apparent from the above, when air supplying amount/spraying rate is 1.0 to 20 m³/g, the fine powder occurrence and large particles are reduced and the method is excellent in the effects of the invention.

Example 21

The same procedure as in Experiment No. 13-5 of Example 14 was carried out, except that the amount of the

TABLE 19

| Experiment No. | Amount of Binder Water to that of Components used (wt %) | Fine Powder Occurrence (wt %) | Amount of Large Particles (wt %) | Powder Adhesion to Inner Walls | Expansion Degree of Tablets (%) | Blocking of Granules | Remarks |
| --- | --- | --- | --- | --- | --- | --- | --- |
| 19-1 | 0.1  | 3.1 | 0.4 | ○ | 1.7 | 2.0 | Invention |
| 19-2 | 0.5  | 2.7 | 0.4 | ○ | 1.5 | 1.8 | Invention |
| 19-3 | 1.0  | 0.5 | 0.4 | ○ | 0.5 | 0.7 | Invention |
| 19-4 | 5.0  | 0.5 | 0.5 | ⊙ | 0.4 | 0.1 | Invention |
| 19-5 | 10.0 | 0.4 | 0.6 | ⊙ | 0.1 | 0.1 | Invention |
| 19-6 | 20.0 | 0.3 | 0.8 | ⊙ | 0.2 | 0.2 | Invention |

TABLE 19-continued

| Experiment No. | Amount of Binder Water to that of Components used (wt %) | Fine Powder Occurrence (wt %) | Amount of Large Particles (wt %) | Powder Adhesion to Inner Walls | Expansion Degree of Tablets (%) | Blocking of Granules | Remarks |
| --- | --- | --- | --- | --- | --- | --- | --- |
| 19-7 | 25.0 | 0.3 | 0.8 | ◉ | 0.2 | 0.2 | Invention |
| 19-8 | 50.0 | 0.3 | 1.0 | ○ | 0.3 | 0.7 | Invention |
| 19-9 | 70.0 | 0.3 | 3.3 | ○ | 1.1 | 1.9 | Invention |

Table 19 shows that when the amount of binder water to that of components used is 1.0 to 50 wt %, the method can prevent fine powder occurrence, large particles, adhesion to cylinder, and expansion degree of tablets and blocking of granules after storage are prevented. Therefore, the invention is more remarkably effected.

Example 22

The same procedure as in Experiment No. 13-5 of Example 14 was carried out, except that the Pineflow concentration of the binder water was varied as shown in Table 20. The resulting samples were evaluated for adhesion to cylinder, occurrence of large particles, expansion degree of tablets and blocking of granules. The results are shown in Table 20.

TABLE 20

| Experiment No. | Pineflow Concentration of Binder Water (wt %) | Occurrence of Large Particles (wt %) | Powder Adhesion to Inner Walls | Expansion Degree of Tablets (%) | Blocking of Granules | Remarks |
| --- | --- | --- | --- | --- | --- | --- |
| 20-1 | 0.1 | 3.0 | ○ | 2.5 | 3.2 | Invention |
| 20-2 | 0.5 | 2.5 | ○ | 2.3 | 3.1 | Invention |
| 20-3 | 1.0 | 1.0 | ○ | 0.6 | 0.7 | Invention |
| 20-4 | 5.0 | 0.9 | ○ | 0.5 | 0.5 | Invention |
| 20-5 | 10.0 | 0.5 | ◉ | 0.2 | 0.2 | Invention |
| 20-6 | 20.0 | 0.6 | ◉ | 0.1 | 0.1 | Invention |
| 20-7 | 30.0 | 0.4 | ◉ | 0.2 | 0.2 | Invention |
| 20-8 | 60.0 | 0.9 | ○ | 0.5 | 0.7 | Invention |
| 20-9 | 80.0 | 3.2 | ○ | 2.7 | 3.5 | Invention |

As is apparent from the above, when the Pineflow concentration of the binder water is 1.0 to 60 wt %, the method can effectively prevent large particles occurrence, powder adhesion to the inner walls of the granulator, and expansion degree of tablets and blocking of granules after storage.

Example 23

The same procedure as in Experiment No. 13-5 of Example 14 was carried out, except that the dwell time of tableting was varied as shown in Table 21 by varying the rotation rate of the turn table. The resulting samples were evaluated for capping rate, expansion degree of tablets and fine powder occurrence due to vibration. The results are shown in Table 21.

TABLE 21

| Experiment No. | Dwell Time (second) | Capping Number (tablets per 500 tablets) | Expansion Degree of Tablets (%) | Fine Powder Occurrence due to Vibration Testing | Remarks |
| --- | --- | --- | --- | --- | --- |
| 21-1 | 0.001 | 13 | 3.0 | 0.17 | Inv. |
| 21-2 | 0.010 | 11 | 0.7 | 0.15 | Inv. |
| 21-3 | 0.020 | 3 | 0.5 | 0.02 | Inv. |
| 21-4 | 0.050 | 0 | 0.1 | 0.01 | Inv. |
| 21-5 | 0.100 | 0 | 0.1 | 0.01 | Inv. |
| 21-6 | 0.800 | 0 | 0.1 | 0.01 | Inv. |
| 21-7 | 1.000 | 0 | 0.2 | 0.10 | Inv. |
| 21-8 | 2.000 | 0 | 0.3 | 0.11 | Inv. |

As is apparent from the above, when the dwell time of tableting granules obtained by the granulating method of the invention is 0.02 to 1.0 second, the method can effectively prevent capping of tablets, and blocking of granules and expansion degree of tablets after storage.

Example 24

A bleach-fixing composition for color paper was prepared according to the following procedure.

(Procedure 14)

In a hammer-mill available on the market 5.0 kg of sodium carbonate hydrate were pulverized to 50 to 150 μm of a weight average particle diameter. The resulting powder and 75.0 kg of ferric sodium ethylenediaminetetraacetate trihydrate were placed in a fluid-bed granulator (GPCG-Type 60 produced by Powrex Co., Ltd.), and granulated in the same manner as in Procedures 10 through 12. Thus, bleach-fixing granules C were obtained.

(Procedure 15)

| | |
|---|---|
| Ammonium thiosulfate/sodium thiosulfate (90/10 weight ratio) mixture | 57.0 kg |
| Sodium metabisulfite | 21.0 kg |
| Sodium carbonate hydrate | 0.7 kg |

In a hammer-mill available on the market each of the above compounds was pulverized to 50 to 150 μm of a weight average particle diameter. The resulting powders were placed in a fluid-bed granulator (GPCG-Type 60 produced by Powrex Co., Ltd.), and granulated in the same manner as in Procedures 10 through 12. Thus, bleach-fixing granules D were obtained.

The resulting granules were similarly evaluated for yield of granules, fine powder occurrence, powder adhesion to the inner walls, large particle occurrence, and blocking of granules. The results are shown in Table 22.

The resulting mixture was tableted using a tableting machine, in which Clean Press Collect 18K produced by Kikusui Seisakusho Co., Ltd. was modified, at the same tableting conditions as Procedure 13.

The resulting tablets were evaluated in the same manner as in Example 23. The results are shown in Table 23.

TABLE 22

| Experiment No. | Kinds of Granules | Airflow Rate (m/sec.) | Yield of Granules (wt %) | Fine Powder Occurrence (wt %) | Large Particle Occurrence (wt %) | Powder Adhesion to Inner Walls | Blocking of Granules (%) | Remarks |
|---|---|---|---|---|---|---|---|---|
| 22-1 | A | 0.01 | 95 | 2.0 | 13.4 | XX | 0.5 | Comparative |
| 22-2 | A | 0.05 | 96 | 2.2 | 12.7 | XX | 0.5 | Comparative |
| 22-3 | A | 0.10 | 99 | 1.5 | 1.6 | ○ | 0.1 | Invention |
| 22-4 | A | 0.50 | 99 | 1.1 | 1.3 | ⊙ | 0.1 | Invention |
| 22-5 | A | 1.00 | 99 | 1.2 | 1.0 | ⊙ | 0.1 | Invention |
| 22-6 | A | 2.00 | 99 | 1.3 | 0.9 | ⊙ | 0.1 | Invention |
| 22-7 | A | 3.00 | 98 | 1.3 | 0.7 | ⊙ | 0.1 | Invention |
| 22-8 | A | 5.00 | 95 | 1.4 | 0.7 | ○ | 0.2 | Invention |
| 22-9 | A | 7.00 | 75 | 25.0 | 2.1 | X | 0.2 | Comparative |
| 22-10 | A | 10.00 | 72 | 26.8 | 2.5 | XX | 0.5 | Comparative |
| 22-11 | B | 0.01 | 81 | 1.8 | 11.2 | X | 5.2 | Comparative |
| 22-12 | B | 0.05 | 83 | 1.6 | 9.5 | X | 4.8 | Comparative |
| 22-13 | B | 0.10 | 94 | 0.3 | 1.3 | ○ | 0.8 | Invention |
| 22-14 | B | 0.50 | 97 | 0.5 | 1.2 | ⊙ | 0.2 | Invention |
| 22-15 | B | 1.00 | 99 | 0.5 | 1.0 | ⊙ | 0.1 | Invention |
| 22-16 | B | 2.00 | 99 | 1.0 | 0.7 | ⊙ | 0.1 | Invention |
| 22-17 | B | 3.00 | 97 | 1.1 | 0.8 | ⊙ | 0.1 | Invention |
| 22-18 | B | 5.00 | 94 | 1.3 | 0.7 | ○ | 0.7 | Invention |
| 22-19 | B | 7.00 | 59 | 12.6 | 2.0 | X | 3.6 | Comparative |
| 22-20 | B | 10.00 | 55 | 13.7 | 1.8 | XX | 3.5 | Comparative |

As is apparent from the above, the manufacturing method of the invention has superior productivity also in solid bleach-fixing composition.

Example 25

(Procedure 17)

The resulting granules C and D, powdered polyethylene glycol #4000, ethylenediamine tetraacetic acid and Soipon SLP (produced by Kawaken Fine Chemical Co., Ltd.) were mixed in an amount ratio of 70:120:10:3:1 for 10 minutes in a cross rotary mixer available on the market.

TABLE 23

| Experiment No. | Airflow Rate (m/sec.) | Capping Number (tablets per 500 tablets) | Expansion Degree of Tablets (%) | Fine Powder Occurrence due to Vibration Testing | Remarks |
| --- | --- | --- | --- | --- | --- |
| 23-1 | 0.01 | 5 | 3.7 | 0.20 | Comp. |
| 23-2 | 0.05 | 4 | 2.6 | 0.11 | Comp. |
| 23-3 | 0.10 | 0 | 0.8 | 0.08 | Inv. |
| 23-4 | 0.50 | 0 | 0.1 | 0.01 | Inv. |
| 23-5 | 1.00 | 0 | 0.1 | 0.01 | Inv. |
| 23-6 | 2.00 | 0 | 0.1 | 0.02 | Inv. |
| 23-7 | 3.00 | 0 | 0.1 | 0.03 | Inv. |
| 23-8 | 5.00 | 0 | 0.7 | 0.08 | Inv. |
| 23-9 | 7.00 | 10 | 5.7 | 1.70 | Comp. |
| 23-10 | 10.00 | 11 | 5.6 | 2.00 | Comp. |

As is apparent from the above, tablets obtained by compression molding granules produced according to the manufacturing method of the invention has superior properties also in solid bleach-fixing composition.

What is claimed is:

1. A method of manufacturing a solid granular processing composition for a silver halide photographic light sensitive material, the method comprising:

fluidizing powder particles in an air current, the particles comprising a compound selected from the group consisting of a thiosulfate, a sulfite, a bisulfite, an aminopolycarboxylic acid ferric complex, a carbonate, a p-phenylenediamine type developing agent and a hydroxylamine or its derivative; and granulating the fluidized particles while spraying the particles with air and binder water using a two fluid nozzle for spraying the air and the binder water to obtain granules, a ratio of the air to the binder water in the two fluid nozzle being 100 to 10,000, the ratio being defined by the following expression:

(volume of air for spraying supplied per unit time)/
(volume of a binder water supplied per unit time), wherein said air current has an air flow rate of 0.1 to 5.0 m/sec. or said granulating is carried out at a theoretical relative humidity of 15 to 60% or at a temperature of 20° to 80° C.

2. The method of claim 1, wherein the theoretical relative humidity is 20 to 50%.

3. The method of claim 1, wherein said fluidizing is carried out in air current having an absolute moisture amount of not more than 0.015 kgH$_2$O/kg.

4. The method of claim 1, wherein the gas/liquid ratio is 1,000 to 5,000.

5. The method of claim 1, wherein dehumidified air is supplied for fluidizing the particles.

6. The method of claim 1, wherein the particles have a weight average diameter of 20 to 350 μm.

7. The method of claim 1, wherein the content of said compound is 5 weight % or more based on the total weight of the composition.

8. The method of claim 1, wherein the total amount of the binder water supplied is 1 to 50 weight % based on the total amount of the particles.

9. The method of claim 1, wherein the binder concentration of the binder water is 1 to 60 weight %.

10. The method of claim 1, wherein a device for the granulating is equipped with a flow rate adjusting plate having an aperture rate of 1.0 to 20%.

11. The method of claim 1, wherein the supplying air amount to spraying rate of the binder water is 1 to 20 m$^3$/g.

12. A method of manufacturing a tablet processing composition for a silver halide photographic light sensitive material, the method comprising the steps of:

fluidizing in an air current powder particles comprising a compound selected from the group consisting of a thiosulfate, a sulfite, a bisulfite, an aminopolycarboxylic acid ferric complex, a carbonate, a p-phenylenediamine type developing agent and a hydroxylamine or its derivative;

granulating the fluidized particles, while spraying the particles with air and binder water using a two fluid nozzle for spraying the air and the binder water to obtain granules, a ratio of the air to the binder water in the two fluid nozzle being 100 to 10,000, the ratio being defined by the following expression:

(volume of air for spraying supplied per unit time)/
(volume of a binder water supplied per unit time), wherein said granulating is carried out at a theoretical relative humidity of 15 to 60% or at a temperature of 20° to 80° C. or said air current has an air flow rate of 0.1 to 5.0 m/sec.; and compression-molding the granules at a dwell time of 0.02 to 1.0 second.

* * * * *